United States Patent
Yuda et al.

(10) Patent No.: US 9,235,872 B2
(45) Date of Patent: Jan. 12, 2016

(54) IMAGE PROCESSING DEVICE, IMAGE PROCESSING METHOD, PROGRAM, AND INTEGRATED CIRCUIT

(75) Inventors: Masato Yuda, Osaka (JP); Naoki Ootani, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 77 days.

(21) Appl. No.: 14/131,045

(22) PCT Filed: May 8, 2012

(86) PCT No.: PCT/JP2012/003009
§ 371 (c)(1),
(2), (4) Date: Jan. 6, 2014

(87) PCT Pub. No.: WO2013/021525
PCT Pub. Date: Feb. 14, 2013

(65) Prior Publication Data
US 2014/0152690 A1   Jun. 5, 2014

(30) Foreign Application Priority Data

Aug. 11, 2011  (JP) .................................. 2011-176343
Aug. 11, 2011  (JP) .................................. 2011-176344

(51) Int. Cl.
*G06T 15/00* (2011.01)
*G06T 11/00* (2006.01)
(Continued)

(52) U.S. Cl.
CPC .  *G06T 1/60* (2013.01); *G06T 5/002* (2013.01); *G06T 11/203* (2013.01); *G06T 15/503* (2013.01); *G06T 2200/12* (2013.01)

(58) Field of Classification Search
USPC ......... 345/418–419, 582, 586, 606, 611–613, 345/501, 530, 536–538, 549, 574; 382/162, 382/167, 254, 266, 269, 274, 276, 305; 711/100, 119
See application file for complete search history.

(56) References Cited

U.S. PATENT DOCUMENTS 5,544,294 A     8/1996  Cho et al.
5,943,060 A *   8/1999  Cosman et al. ............... 345/613
(Continued)

FOREIGN PATENT DOCUMENTS

CN  1942922      4/2007
JP  2003-30681   1/2003
(Continued)

OTHER PUBLICATIONS

International Search Report issued Aug. 21, 2012 in International Application No. PCT/JP2012/003009.
(Continued)

*Primary Examiner* — Wesner Sajous
(74) *Attorney, Agent, or Firm* — Wenderoth, Lind & Ponack, L.L.P.

(57) ABSTRACT

An image processing device (10) includes: a representative pixel value storage unit (12) which selects one of plural sub-pixels as a representative sub-pixel, and store, into a representative pixel value storage area, a representative pixel value which is a pixel value of the representative sub-pixel; and a sub-pixel value storage unit (13) which stores, into a sub-pixel value storage area, pixel values of sub-pixels other than the representative sub-pixel, wherein the sub-pixel value storage area stores one or more sets corresponding to N number of pixels, the one or more sets each including a pixel position and a pixel value of each sub-pixel other than the representative sub-pixel of a pixel at the pixel position, N being a natural number smaller than a total number of the plural pixels in the unit of processing for an edge determination unit (11).

28 Claims, 21 Drawing Sheets

(51) Int. Cl.

| | | |
|---|---|---|
| *G06T 5/00* | (2006.01) | |
| *G06T 3/40* | (2006.01) | |
| *G09G 5/02* | (2006.01) | |
| *G09G 5/39* | (2006.01) | |
| *G06T 1/60* | (2006.01) | |
| *G06T 15/50* | (2011.01) | |
| *G06T 11/20* | (2006.01) | |

(56) References Cited

U.S. PATENT DOCUMENTS

| | | | |
|---|---|---|---|
| 5,949,428 A * | 9/1999 | Toelle et al. | 345/589 |
| 6,201,545 B1 * | 3/2001 | Wong | G06T 17/00 345/428 |
| 6,317,525 B1 * | 11/2001 | Aleksic et al. | 382/299 |
| 6,407,736 B1 * | 6/2002 | Regan | 345/422 |
| 6,501,483 B1 * | 12/2002 | Wong et al. | 345/611 |
| 6,525,723 B1 * | 2/2003 | Deering | G06T 5/20 345/419 |
| 6,828,983 B1 * | 12/2004 | Vijayakumar et al. | 345/613 |
| 7,352,374 B2 | 4/2008 | Brown Elliott et al. | |
| 8,031,205 B2 | 10/2011 | Brown Elliott et al. | |
| 2003/0059114 A1 * | 3/2003 | Naoi | 382/181 |
| 2004/0196297 A1 | 10/2004 | Elliott et al. | |
| 2008/0158243 A1 | 7/2008 | Brown Elliott et al. | |
| 2013/0301732 A1 * | 11/2013 | Hsu | H04N 19/136 375/240.16 |

FOREIGN PATENT DOCUMENTS

| | | |
|---|---|---|
| JP | 3626709 | 3/2005 |
| JP | 2005-346605 | 12/2005 |
| JP | 2006-4088 | 1/2006 |

OTHER PUBLICATIONS

Office Action issued Sep. 7, 2015 in corresponding Chinese Application No. 201280033790.2, with partial English translation.

Edgar Velázquez-Armendáriz et al., "Implementing the Render Cache and the Edge-and-Point Image on Graphics Hardware", Proceedings of Graphics Interface 2006, Jun. 30, 2006, pp. 211-217.

Konstantine Iourcha et al., "A Directionally Adaptive Edge Anti-Aliasing Filter", Proceedings of the Conference on High Performance Graphics, Aug. 3, 2009, pp. 127-134.

Matthäus G. Chajdas et al., "Subpixel Reconstruction Antialiasing for Deferred Shading", Symposium on Interactive 3D Graphics and Games, Feb. 20, 2011, pp. 15-22.

Hou-jun Hang et al., "One Antialiasing Algorithm Based on Weighting Region Sampling", Computer Technology and Development, vol. 19, No. 6, Jun. 2009, pp. 138-141, with English language abstract.

* cited by examiner

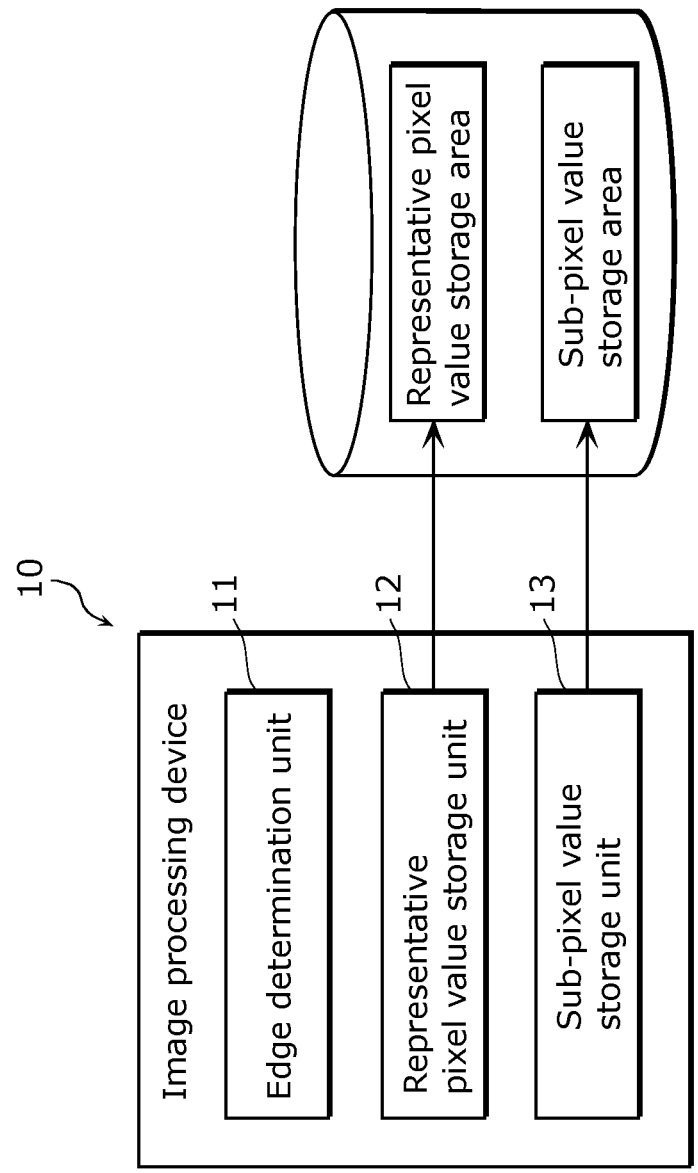

FIG. 7A

| Pattern | (A) | (B) | (C) |
|---|---|---|---|
| Color value | (0, 0, 255) (255, 0, 0) | (255, 102, 255) | (255, 153, 102) |
| Greatest color difference | 361 | 297 | 216 |

FIG. 7B

| Pattern | (A) | (B) | (C) |
|---|---|---|---|
| Depth value | 0.8 / 0.2 | 0.6 | 0.3 |
| Greatest value of difference in depth value | 0.6 | 0.4 | 0.1 |
| Relationship between two polygons | Close 0.0 — Far 1.0 | Close 0.0 — Far 1.0 | Close 0.0 — Far 1.0 |

Example of data in representative pixel value storage area

FIG. 8C

| ID | Sub-pixel value 1 | Sub-pixel value 2 | Sub-pixel value 3 | | Pixel position ID |
|---|---|---|---|---|---|
| 0 | 15b | 15c | 15d | | 15 |
| 1 | 22b | 22c | 22d | | 22 |
| 2 | 29b | 29c | 29d | | 29 |
| 3 | 36b | 36c | 36d | | 36 |
| ⋮ | ⋮ | ⋮ | ⋮ | | ⋮ |
| 15 | | | | | |

Example of data in sub-pixel value storage area

FIG. 9A

| | ZFUNC | LESS | GREATER |
|---|---|---|---|
| Depth value | 0.5  0.3 / 0.6  0.5 | 0.3 | 0.6 |
| Color value | (255, 0, 0) / (0, 0, 255) / (0, 255, 0) / (255, 0, 0) | (0, 0, 255) | (0, 255, 0) |

FIG. 9B

| Pattern | (A) | (B) | (C) |
|---|---|---|---|
| Write-enable bit (0: Unable/1: Able) | 0 1 / 0 0 | 0 0 / 0 1 | 0 1 / 1 0 |
| Depth value | 0.4 0.3 / 0.6 0.5 | 0.3 | 0.6 | 0.4 |
| Color value | (0, 0, 255) (255, 0, 0) / (255, 0, 0) (0, 255, 0) | (0, 0, 255) | (0, 255, 0) | (255, 0, 0) |

Example of data in representative pixel value storage area

| ID | Sub-pixel value 1 | Sub-pixel value 2 | Sub-pixel value 3 | Pixel position ID |
|---|---|---|---|---|
| 0 | 15b | 15c | 15d | 15 |
| 1 | 22b | 22c | 22d | 22 |
| 2 | 29b | 29c | 29d | 29 |
| 3 | 36b | 36c | 36d | 36 |
| ⋮ | ⋮ | ⋮ | ⋮ | ⋮ |
| 15 | 62b | 62c | 62d | 62 |

Example of data in sub-pixel value storage area

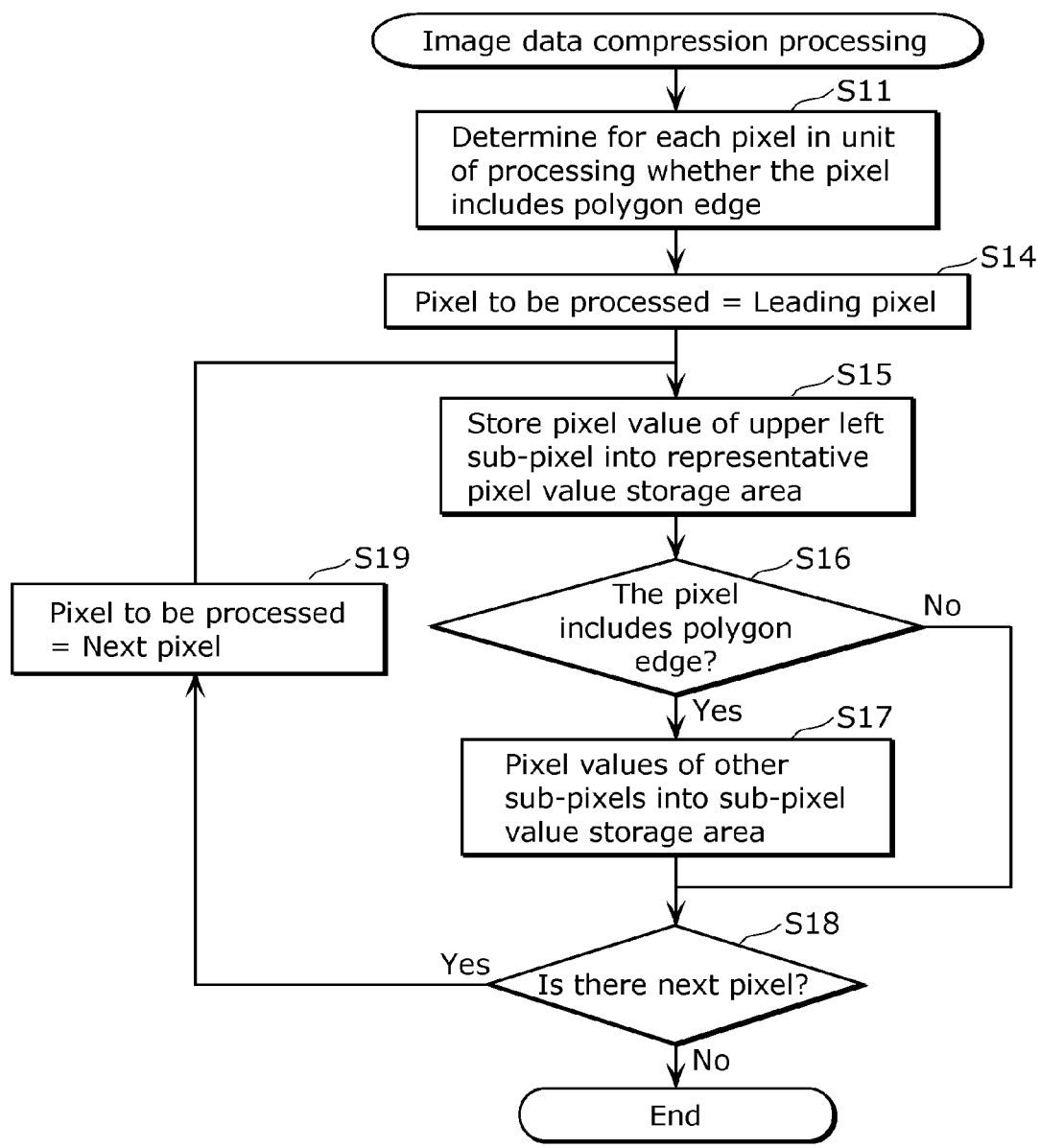

(A)        (B)

IMAGE PROCESSING DEVICE, IMAGE PROCESSING METHOD, PROGRAM, AND INTEGRATED CIRCUIT

TECHNICAL FIELD

The present invention relates to image processing devices, and in particular to image processing devices which perform image processing, such as anti-aliasing, on three-dimensional graphics (3D-graphics) images.

BACKGROUND ART

A digital image cannot be rendered in units smaller than pixel units, thus causing jaggies at the contour (edge) of a polygon. For example, when a polygon as shown in (A) of FIG. 16 is rendered, a scaled-up oblique contour of the polygon has stair-stepping (jagged) appearance as shown in (B) of FIG. 16. A technique of anti-aliasing is used to make such jaggies less prominent.

CITATION LIST

Patent Literature

[PTL 1] Japanese Patent No. 3626709

SUMMARY OF INVENTION

Technical Problem

However, anti-aliasing requires a large capacity memory, which is a problem.

The present invention addresses the above conventional problems, and an object thereof is to provide an image processing device which achieves improvement in image quality without requiring a large memory, while storing information on sub-pixels as much as possible.

Solution to Problem

An image processing device according to an aspect of the present invention includes: an edge determination unit configured to determine, for each of plural pixels in a unit of processing, whether the pixel includes a predetermined edge, the plural pixels being included in image data; a representative pixel value storage unit configured to, for each of the plural pixels, select one of plural sub-pixels obtained by dividing the pixel, as a representative sub-pixel or generate the representative sub-pixel by mixing pixel values of the plural sub-pixels, and store, into a representative pixel value storage area, a representative pixel value which is a pixel value of the representative sub-pixel; and a sub-pixel value storage unit configured to store, into a sub-pixel value storage area, pixel values of two or more of the plural sub-pixels in each of pixels determined by the edge determination unit to include the predetermined edge, the two or more of the plural sub-pixels being other than the representative sub-pixel selected by the representative pixel value storage unit. The sub-pixel value storage area stores one or more sets corresponding to N number of pixels, the one or more sets each including a pixel position and a pixel value of each sub-pixel other than the representative sub-pixel of a pixel at the pixel position, N being a natural number smaller than a total number of the plural pixels in the unit of processing for the edge determination unit.

It should be noted that these general and specific aspects may be implemented using a system, a method, an integrated circuit, a computer program, a recording medium, or any combination of systems, methods, integrated circuits, computer programs, and recording media.

Advantageous Effects of Invention

According to the present invention, for example, a memory band necessary for data transfer between memories and memory capacity can be reduced by improving a structure of image data stored in a memory and limiting the number of pixels which can be stored in a sub-pixel value storage area.

BRIEF DESCRIPTION OF DRAWINGS

FIG. 1A briefly illustrates an image processing device according to an aspect of the present invention.

FIG. 7A shows an example of selecting a pixel, based on a greatest color difference.

FIG. 7B shows an example of selecting a pixel, based on a greatest difference in depth values.

FIG. 8C shows an example of data stored in a sub-pixel value storage area.

FIG. 9A shows an example of selecting a representative sub-pixel, based on a result of Z-test.

FIG. 9B shows an example of selecting a representative sub-pixel, based on write-enable bits.

FIG. 14 is a flowchart showing steps of processing by the transfer unit in FIG. 13.

DESCRIPTION OF EMBODIMENTS (Underlying Knowledge Forming Basis of the Present Invention)

One of the anti-aliasing techniques is to make jaggies less prominent by blending a pixel value of a rendered graphic and a pixel value of the background, based on the occupancy of the rendered graphic in a pixel area where jaggies are caused. The occupancy is a value indicating a proportion of an area of a pixel where a graphic is rendered to that pixel. One method for calculating occupancy is a known algorithm (oversampling) for setting plural sampling points in a range of one pixel, determining for each sampling point as to whether the point is located inside or outside the area where a graphic is rendered, and using, as the occupancy, the ratio of the number of points determined to be inside the area where a graphic is rendered to the number of sampling points in one pixel.

In the case of 3D graphics, coordinates are present also in a depth direction relative to a screen, and often plural graphics overlap in the depth direction. It is possible to perform anti-aliasing on 3D graphics using oversampling by virtually dividing one pixel into plural sampling points (sub-pixels) and determining for each sub-pixel of all the graphics whether rendering is performed. Then, after rendering all the graphics, pixel values (colors) of sub-pixels of each pixel are mixed, and the obtained color is used as the color of that pixel. However, until the end of rendering all the graphics, a large memory for storing all the sub-pixel colors is necessary, and furthermore a band for writing to the memory is necessary according to a multiple of sampling points.

A conventional image processing device uses a method for reducing necessary memory capacity by limiting the number of sub-pixels which can be held in each pixel to a number smaller than the number of sampling points, to solve the above problems (for example, see Patent Literature (PTL) 1).

Figure 17:
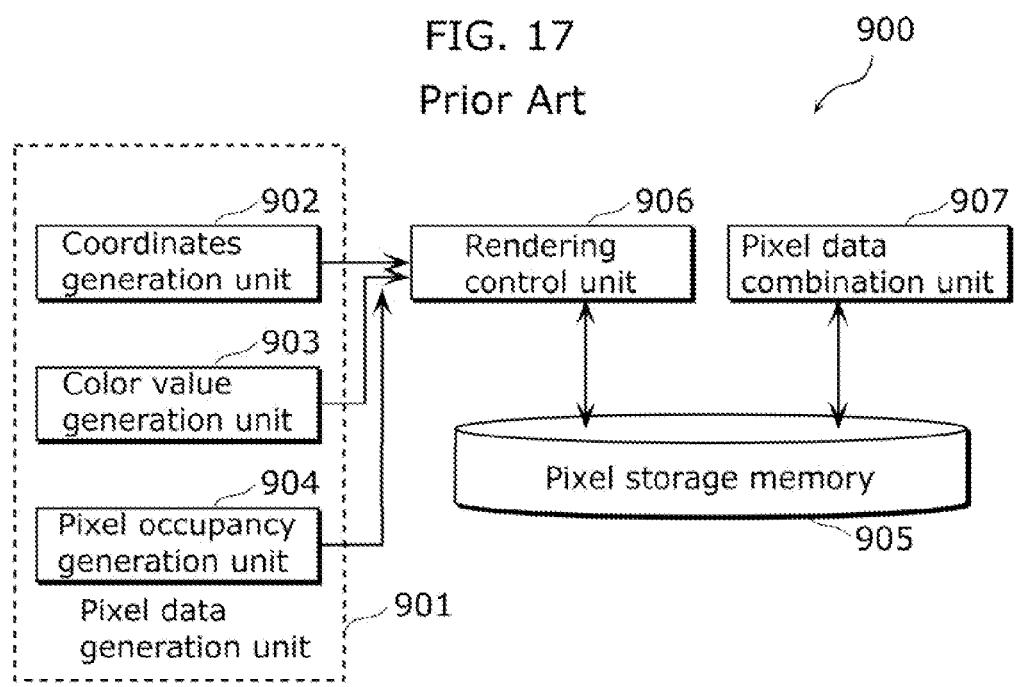
FIG. 17 is a block diagram showing a configuration of a conventional image processing device.

FIG. 17 shows a conventional image processing device 900 disclosed in PTL 1. In FIG. 17, the image processing device 900 includes a rendering control unit 906, a pixel storage memory 905, a pixel data combination unit 907, and a pixel data generation unit 901 that includes a coordinates generation unit 902, a color value generation unit 903, and a pixel occupancy generation unit 904.

The coordinates generation unit 902 generates 3D vertex coordinates of a graphic to be rendered, based on a rendering instruction from a central unit of processing (CPU) (not illustrated). The color value generation unit 903 generates a color value of a pixel to be used for rendering, based on the rendering instruction from the CPU. The pixel occupancy generation unit 904 calculates, for each pixel, occupancy of a graphic to be rendered.

The rendering control unit 906 performs writing control (selects pixel data) for each pixel, based on a depth value (Z value) and occupancy when pixel data generated by the pixel data generation unit 901 is to be stored in the pixel storage memory 905. The pixel storage memory 905 stores, for each pixel, a predetermined number of (a plurality of) pixel data pieces of plural graphics rendered using the same pixel. The pixel data combination unit 907 mixes, for each pixel stored in the pixel storage memory 905, color values of pixel data pieces of the same pixel, based on the occupancy and a Z value of pixel data of that pixel.

Specifically, in PTL 1, the number of sub-pixel data pieces to be stored for each pixel is limited, and if the number exceeds the limit, pixel data is combined, thereby reducing necessary memory capacity.

However, according to the above conventional configuration, the number of sub-pixel data pieces to be stored for one pixel is limited to the number of overlapping graphics, and thus sub-pixel data is repeatedly selected when many overlaps of graphics occur in the same pixel in sub-pixel units. This results in a problem that image quality easily and locally deteriorates.

In order to solve such a problem, an image processing device according to an aspect of the present invention includes: an edge determination unit configured to determine, for each of plural pixels in a unit of processing, whether the pixel includes a predetermined edge, the plural pixels being included in image data; a representative pixel value storage unit configured to, for each of the plural pixels, select one of plural sub-pixels obtained by dividing the pixel, as a representative sub-pixel or generate the representative sub-pixel by mixing pixel values of the plural sub-pixels, and store, into a representative pixel value storage area, a representative pixel value which is a pixel value of the representative sub-pixel; and a sub-pixel value storage unit configured to store, into a sub-pixel value storage area, pixel values of two or more of the plural sub-pixels in each of pixels determined by the edge determination unit to include the predetermined edge, the two or more of the plural sub-pixels being other than the representative sub-pixel selected by the representative pixel value storage unit. The sub-pixel value storage area stores one or more sets corresponding to N number of pixels, the one or more sets each including a pixel position and a pixel value of each sub-pixel other than the representative sub-pixel of a pixel at the pixel position, N being a natural number smaller than a total number of the plural pixels in the unit of processing for the edge determination unit.

Based on the above configuration, a memory band necessary for data transfer between memories and memory capacity can be reduced by improving a structure of image data stored in memories and limiting the number of pixels which can be stored in the sub-pixel value storage area.

The image processing device may further include: a first memory which stores, as image data, pixel values of plural sub-pixels obtained by dividing each of pixels included in an image; a second memory which includes the representative pixel value storage area and the sub-pixel value storage area; an image processing unit configured to perform image processing on the image data stored in the first memory; and a transfer unit configured to transfer at least a portion of the image data stored in the first memory between the first memory and the second memory, the transfer unit including: the edge determination unit; the representative pixel value storage unit; and the sub-pixel value storage unit.

As a typical example of the above configuration, the first memory is a memory which stores image data accessed by the image processing unit at a high frequency, whereas the second memory is a memory for temporarily saving, for instance, image data accessed by the image processing unit at a low frequency. Now, the first memory needs to store pixel values of all sub-pixels, whereas the second memory may store representative pixel values of pixels which do not include a polygon edge, and pixel values of all the sub-pixels of pixels including a polygon edge. In this manner, a memory band necessary for data transfer between the first and second memories and the capacity of the second memory can be reduced by improving a data structure of saved data.

The edge determination unit may be configured to calculate a total number of the pixels in the unit of processing each of which includes the predetermined edge. The sub-pixel value storage unit may be configured to increase N, with an increase in the total number of the pixels calculated by the edge determination unit, in exchange for decreasing a total number of bits in each pixel value to be stored in the representative pixel value storage area and/or the sub-pixel value storage area, N indicating a total number of pixels storable in the sub-pixel value storage area.

In this manner, by increasing the number of pixels which can be stored in the sub-pixel value storage area in exchange for lowering the accuracy (number of bits) of pixel values to be stored in the second memory, the capacity of the second memory can be fixed both when image data of an image having many polygon edges is stored and when image data of an image having few polygon edges is stored.

The image processing device may further include: a pixel selection unit configured to select, when a total number of the pixels determined by the edge determination unit to include the predetermined edge exceeds N that is the natural number, N pixels from among the pixels determined to include the predetermined edge. For each of the pixels selected by the pixel selection unit, the sub-pixel value storage unit may be configured to store the pixel value of each sub-pixel other than the representative sub-pixel of the pixel into the sub-pixel value storage area.

The pixel selection unit may be configured to calculate, for each of the pixels determined by the edge determination unit to include the predetermined edge, a greatest color difference between the sub-pixels included in the pixel, and select N pixels in descending order of the calculated greatest color difference.

In this manner, when there are many pixels each including a polygon edge, the capacity of the second memory can be fixed by not storing the pixel values of sub-pixels other than the representative sub-pixels of pixels each including a less prominent polygon edge (pixels having a small greatest color difference) into the sub-pixel value storage area.

The pixel value of each of the sub-pixels may include a color value indicating a color of a pixel which includes the sub-pixel, and a depth value indicating a position of the sub-pixel in a depth direction. The pixel selection unit may be configured to select N pixels from among the pixels determined by the edge determination unit to include the predetermined edge, in descending order of a greatest difference in the depth value between the sub-pixels.

The pixel value of each of the sub-pixels may include a color value indicating a color of a pixel which includes the sub-pixel, and a depth value indicating a position of the sub-pixel in a depth direction. The pixel selection unit may be configured to, for each of the pixels determined by the edge determination unit to include the predetermined edge, calculate a greatest color difference between the sub-pixels included in the pixel, select N pixels in descending order of the calculated greatest color difference, and select N pixels from among the pixels determined by the edge determination unit to include the predetermined edge, in descending order of a greatest difference in the depth value between the sub-pixels. The sub-pixel value storage unit may be configured to store, into different areas of the sub-pixel value storage area, a color value of each sub-pixel other than the representative sub-pixel of each of the N pixels selected by the pixel selection unit in descending order of the greatest color difference, and a depth value of each sub-pixel other than the representative sub-pixel of each of the N pixels selected by the pixel selection unit in descending order of the greatest difference in the depth value.

Each of pixels included in the image may be associated with a combination completed bit set to one of a first value and a second value, the first value indicating that the representative sub-pixel has been generated by mixing pixel values of plural sub-pixels included in the pixel, the second value indicating that pixel values of plural sub-pixels included in the pixel are not yet mixed. The pixel selection unit may be configured to select N pixels from among pixels determined by the edge determination unit to include the predetermined edge and associated with the combination completed bit set to the second value.

The image processing device may further include: a first memory which stores, as image data, the pixel values of the sub-pixels obtained by dividing each of the pixels included in the image; and an image processing unit configured to perform image processing on the image data stored in the first memory. For each of the sub-pixels, the first memory may further store a write-enable bit set to one of a third value and a fourth value, the third value indicating that the sub-pixel is used to render a polygon in immediately preceding rendering processing by the image processing unit, the fourth value indicating that the sub-pixel is not used to render a polygon in the immediately preceding rendering processing by the image processing unit. For each of the pixels determined by the edge determination unit to include the predetermined edge and associated with the combination completed bit set to the second value, the representative pixel value storage unit may be configured to select a sub-pixel associated with the write-enable bit set to the third value as the representative sub-pixel, from among plural sub-pixels included in the pixel, or generate the representative sub-pixel by mixing pixel values of sub-pixels each associated with the write-enable bit set to the third value.

The representative pixel value storage unit may be configured to set, to the first value, the combination completed bit of a pixel determined by the edge determination unit to include the predetermined edge and not selected by the pixel selection unit.

The edge determination unit may be configured to calculate, for each of the plural pixels in the unit of processing, a greatest color difference between the sub-pixels included in the pixel, and determine a pixel the calculated greatest color difference of which exceeds a threshold value to include the predetermined edge.

The image processing device may further include: a first memory which stores, as image data, pixel values of plural sub-pixels obtained by dividing each of pixels included in an image; and an image processing unit configured to perform image processing on the image data stored in the first memory. For each of the sub-pixels, the first memory may further store a write-enable bit set to one of a third value and a fourth value, the third value indicating that the sub-pixel is used for rendering in immediately preceding rendering processing by the image processing unit, the fourth value indicating that the sub-pixel is not used for rendering in the immediately preceding rendering processing by the image processing unit. The edge determination unit may be configured to determine, among the plural pixels in the unit of processing, a pixel including sub-pixels associated with the write-enable bits having different values to include the predetermined edge.

The pixel value of each sub-pixel may include a color value indicating a color of a pixel which includes the sub-pixel, and a depth value indicating a position of the sub-pixel in a depth direction. The representative pixel value storage unit may be configured to select or generate the representative sub-pixel of each of the plural pixels, based on a difference in the depth value between the sub-pixels included in the pixel.

The image processing unit may be configured to perform anti-aliasing on the image data stored in the first memory, processing of newly creating the image data, or processing of editing an image represented by the image data.

The transfer unit may further include: a representative pixel value reading unit configured to read, from the representative pixel value storage area of the second memory, the representative pixel value of each of the plural pixels in the unit of processing; a sub-pixel value reading unit configured to read, from the sub-pixel value storage area of the second memory, the pixel value of each sub-pixel other than the representative sub-pixel of each pixel determined to include the predetermined edge; and a pixel load unit configured to generate a pixel value of each pixel including the predetermined edge, from the representative pixel value read by the representative pixel value reading unit and the pixel value of each sub-pixel other than the representative sub-pixel read by the sub-pixel value reading unit, generate a pixel value of each of pixels determined not to include the predetermined edge, by duplicating the representative pixel value read by the representative pixel value reading unit to each sub-pixel, and write image data including the generated pixel values of the pixels into the first memory.

Each of the pixels included in the image may be associated with a combination completed bit set to one of a first value and a second value, the first value indicating that the representative sub-pixel has been generated by mixing pixel values of plural sub-pixels included in the pixel, the second value indicating that pixel values of plural sub-pixels included in the pixel are not yet mixed. For each of the sub-pixels, the first memory may further store a write-enable bit set to one of a third value and a fourth value, the third value indicating that the sub-pixel is used for rendering in immediately preceding rendering processing by the image processing unit, the fourth value indicating that the sub-pixel is not used for rendering in the immediately preceding rendering processing by the image processing unit. The image processing unit may be configured to set, to the second value, the combination completed bit of a pixel including sub-pixels each having the write-enable bit set to the third value, after rendering processing.

As an example, the predetermined edge may be a polygon edge.

An image processing method according to an aspect of the present invention includes: (a) determining, for each of plural pixels in a unit of processing, whether the pixel includes a predetermined edge, the plural pixels being included in image data; (b) for each of the plural pixels, selecting one of plural sub-pixels obtained by dividing the pixel, as a representative sub-pixel or generating the representative sub-pixel by mixing pixel values of the plural sub-pixels, and storing, into a representative pixel value storage area, a representative pixel value which is a pixel value of the representative sub-pixel; and (c) storing, into a sub-pixel value storage area, pixel values of two or more of the plural sub-pixels in each of pixels determined in step (a) to include the predetermined edge, the two or more of the plural sub-pixels being other than the representative sub-pixel selected in step (b). The sub-pixel value storage area stores one or more sets corresponding to N number of pixels, the one or more sets each including a pixel position and a pixel value of each sub-pixel other than the representative sub-pixel of a pixel at the pixel position, N being a natural number smaller than a total number of the plural pixels in the unit of processing for the edge determination unit.

A program according to an aspect of the present invention causes a computer to process an image. Specifically, the program causes a computer to execute: (a) determining, for each of plural pixels in a unit of processing, whether the pixel includes a predetermined edge, the plural pixels being included in image data; (b) for each of the plural pixels, selecting one of plural sub-pixels obtained by dividing the pixel, as a representative sub-pixel or generating the representative sub-pixel by mixing pixel values of the plural sub-pixels, and storing, into a representative pixel value storage area, a representative pixel value which is a pixel value of the representative sub-pixel; and (c) storing, into a sub-pixel value storage area, pixel values of two or more of the plural sub-pixels in each of pixels determined in step (a) to include the predetermined edge, the two or more of the plural sub-pixels being other than the representative sub-pixel selected in step (b). The sub-pixel value storage area stores one or more sets corresponding to N number of pixels, the one or more sets each including a pixel position and a pixel value of each sub-pixel other than the representative sub-pixel of a pixel at the pixel position, N being a natural number smaller than a total number of the plural pixels in the unit of processing for the edge determination unit.

An integrated circuit according to an aspect of the present invention includes: an edge determination unit configured to determine, for each of plural pixels in a unit of processing, whether the pixel includes a predetermined edge, the plural pixels being included in image data; a representative pixel value storage unit configured to, for each of the plural pixels, select one of plural sub-pixels obtained by dividing the pixel, as a representative sub-pixel or generate the representative sub-pixel by mixing pixel values of the plural sub-pixels, and store, into a representative pixel value storage area, a representative pixel value which is a pixel value of the representative sub-pixel; and a sub-pixel value storage unit configured to store, into a sub-pixel value storage area, pixel values of two or more of the plural sub-pixels in each of pixels determined by the edge determination unit to include the predetermined edge, the two or more of the plural sub-pixels being other than the representative sub-pixel selected by the representative pixel value storage unit. The sub-pixel value storage area stores one or more sets corresponding to N number of pixels, the one or more sets each including a pixel position and a pixel value of each sub-pixel other than the representative sub-pixel of a pixel at the pixel position, N being a natural number smaller than a total number of the plural pixels in the unit of processing for the edge determination unit.

It should be noted that these general and specific aspects may be implemented using a system, a method, an integrated circuit, a computer program, a recording medium, or any combination of systems, methods, integrated circuits, computer programs or recording media.

The following describes embodiments of the present invention, with reference to the drawings. Each of the embodiments described below shows a specific example. The numerical values, shapes, materials, constituent elements, the arrangement and connection of the constituent elements, steps, the processing order of the steps, and the like shown in the following embodiments are mere examples, and thus are not intended to limit the present invention. Therefore, among the constituent elements in the following exemplary embodiments, constituent elements not recited in any of the independent claims defining the most generic part of the inventive concept are described as arbitrary constituent elements.

First, a brief description is given of an image processing device according to an aspect of the present invention, with reference to FIG. 1A. FIG. 1A is a schematic block diagram of an image processing device 10 according to an aspect of the present invention. The image processing device 10 includes an edge determination unit 11, a representative pixel value storage unit 12, and a sub-pixel value storage unit 13, as shown in FIG. 1A.

The edge determination unit 11 determines, for each of plural pixels in one unit of processing, whether the pixel includes a predetermined edge, the plural pixels being included in image data. For each of the plural pixels, the representative pixel value storage unit 12 selects one of plural sub-pixels as a representative sub-pixel or generates the representative sub-pixel by mixing pixel values of the plural sub-pixels, and store, into a representative pixel value storage area, a representative pixel value which is a pixel value of the representative sub-pixel. For each pixel determined by the edge determination unit 11 to include the predetermined edge, the sub-pixel value storage unit 13 stores, into a sub-pixel value storage area, a pixel value of one or more of the plural sub-pixels other than the representative sub-pixel selected by the representative pixel value storage unit 12.

Embodiment 1

Figure 1B:
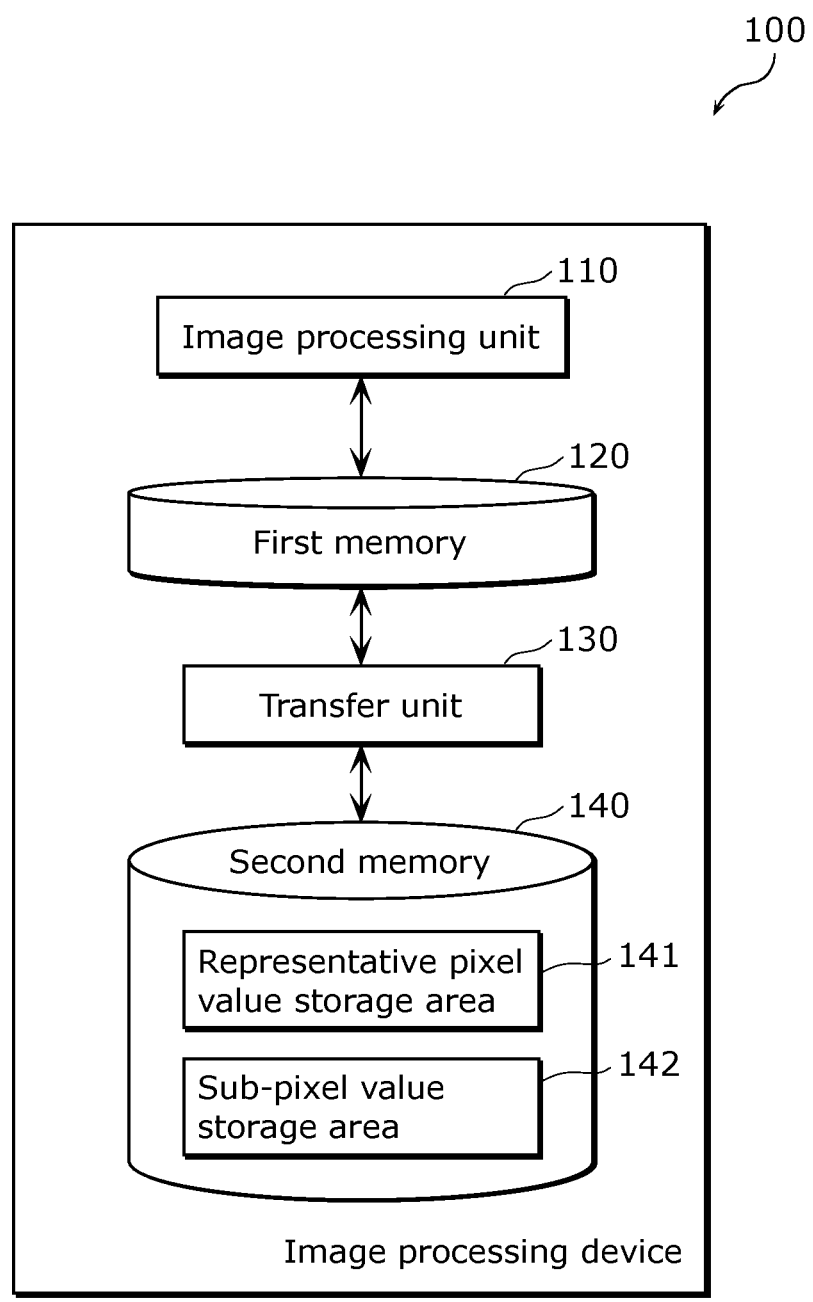
FIG. 1B is a block diagram showing a configuration of an image processing device according to Embodiment 1 of the present invention.

FIG. 1B is a block diagram showing an example of a specific configuration of an image processing device according to Embodiment 1 of the present invention. The image processing device 100 shown in FIG. 1B mainly includes an image processing unit 110, a first memory 120, a transfer unit 130, and a second memory 140.

The first memory 120 and the second memory 140 are storage units for storing image data of images. Although a common aspect of the first and second memories 140 is to store image data, the memories store image data in different data formats. A detailed description is given below.

The first memory 120 is typically a cache memory which stores data highly frequently accessed by a rasterizer circuit (not illustrated). In contrast, the second memory 140 is a main memory which stores data accessed less frequently by the rasterizer circuit than data in the first memory 120. Alternatively, the first memory 120 may be a main memory including a cache memory, and the second memory 140 may be a virtual memory.

It should be noted that although a specific configuration of the storage units is not particularly limited, and any means which can record data such as, for example, a dynamic random access memory (DRAM), a synchronous dynamic random access memory (SDRAM), a flash memory, a ferroelectric memory, or a hard disk drive (HDD) can be utilized as the storage units.

The image processing unit 110 performs image processing on image data stored in the first memory 120. A description of a specific example of image processing by the image processing unit 110 is given below. The transfer unit 130 transfers image data between the first memory 120 and the second memory 140. A description of a specific example of processing of transferring image data by the transfer unit 130 is given below.

Figure 2A:
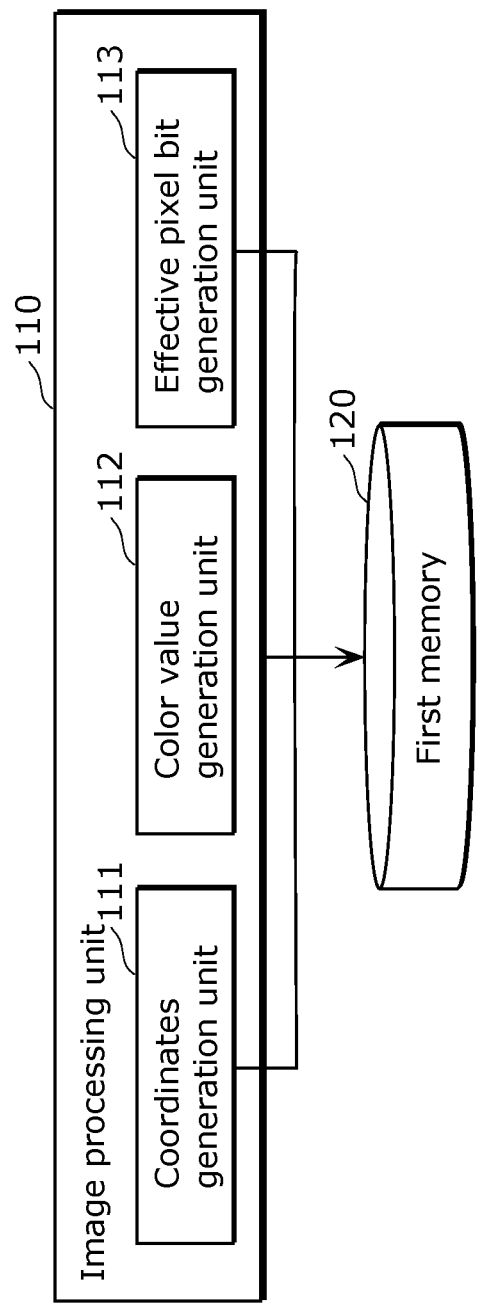
FIG. 2A shows an example of a specific configuration of an image processing unit.
Figure 2B:
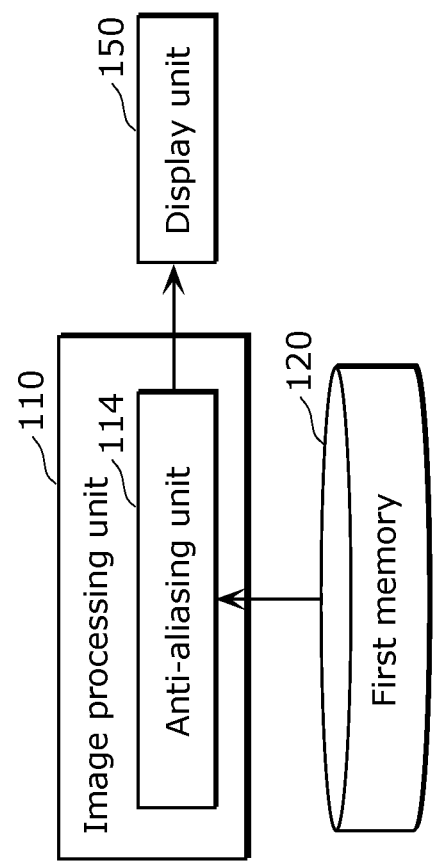
FIG. 2B shows another example of a specific configuration of the image processing unit.

Next, a specific description is given of image processing by the image processing unit 110, with reference to FIGS. 2A and 2B.

First, the image processing unit 110 shown in FIG. 2A newly renders an image (polygon image), stores image data of the rendered image into the first memory 120, and edits image data of an image already stored in the first memory 120 (such as addition, modification, and deletion). Specifically, the image processing unit 110 shown in FIG. 2A includes a coordinates generation unit 111, a color value generation unit 112, and an effective pixel bit generation unit 113.

The coordinates generation unit 111 generates information on position coordinates of a pixel to be used for rendering, based on a rendering instruction from the rasterizer circuit (not illustrated). The color value generation unit 112 generates a pixel value of a pixel to be used for rendering, based on a rendering instruction from the rasterizer circuit. The effective pixel bit generation unit 113 determines whether a pixel to be used for rendering is an effective pixel (pixel to be used for display), and generates an effective pixel bit (write-enable bit) when the pixel is an effective pixel. Then, the image processing unit 110 stores image data of the rendered image into the first memory 120, based on information generated by the coordinates generation unit 111, the color value generation unit 112, and the effective pixel bit generation unit 113.

It should be noted that a "pixel value" of a pixel in this specification includes a color value indicating a color of the pixel (or sub-pixel) and a depth value indicating a position of the pixel (or sub-pixel) in the depth direction, for example. Further, a combination completed bit and a write-enable bit may be included in a pixel value, or may be stored together with the pixel value.

A combination completed bit is a bit associated with each pixel which forms an image, and is set to a first value (for example, "1") indicating that a representative sub-pixel is generated by mixing pixel values of plural sub-pixels included in the pixel or a second value (for example, "0") indicating that pixel values of plural sub-pixels are not yet mixed. It should be noted that this combination completed bit is typically transferred between the first and second memories 120 and 140, together with a color value, a depth value, and others.

A write-enable bit is a bit associated with each sub-pixel, and is set to a third value (for example, "1") indicating that the sub-pixel is used to render a polygon in immediately preceding rendering processing by the image processing unit 110 or a fourth value (for example, "0") indicating that the sub-pixel is not used to render a polygon in immediately preceding rendering processing. Typically, such write-enable bits are stored in the first memory 120, and are not transferred to the second memory 140.

Specifically, the effective pixel bit generation unit 113 sets, to the third value, a write-enable bit associated with a sub-pixel used for newly rendering a polygon image. Further, after rendering processing, the effective pixel bit generation unit 113 sets, to the second value, a combination completed bit associated with a pixel having sub-pixels all associated with write-enable bits set to the third value.

Figure 3A:
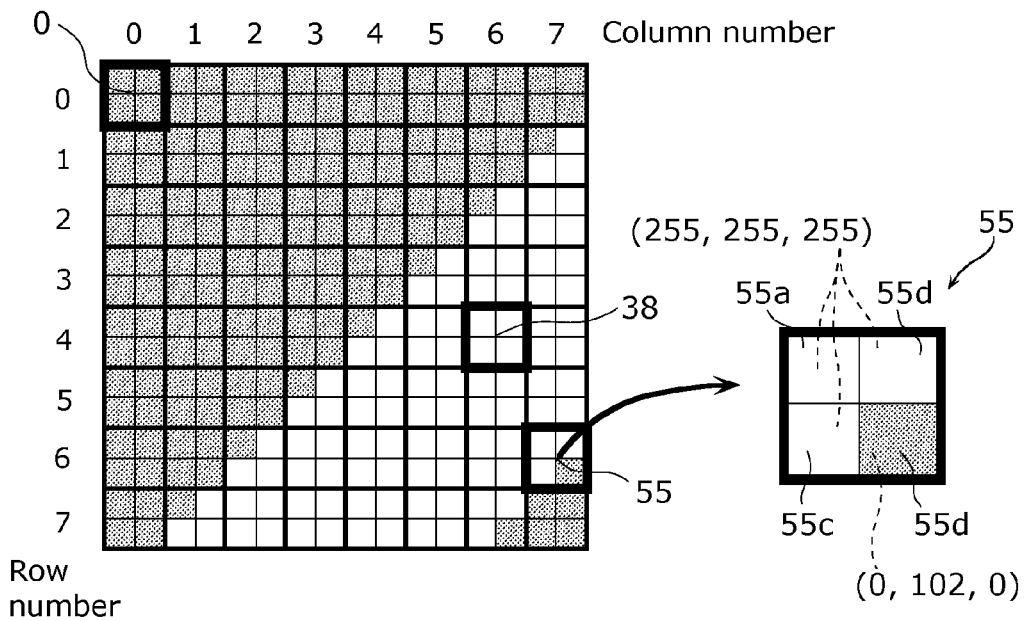
FIG. 3A shows an example of 64-pixel image data generated by the image processing unit.

FIG. 3A shows an example of image data generated by the image processing unit 110 described above and stored in the first memory 120. FIG. 3A shows an example of image data which includes 8 pixels in width and 8 pixels in height, that is, 64 pixels in total. Each pixel has sampling points the number of which is 2 sub-pixels in width and 2 sub-pixels in height, that is, 4 in total.

It should be noted that in the description below, a pixel number (pixel position ID) for identifying each pixel is defined as follows. Specifically, a pixel position ID of a pixel identified based on the row number ($\alpha=0$ to 7) and the column number ($\beta=0$ to 7) in FIG. 3A is defined as $8\times\alpha+\beta$. In other words, the pixels can be expressed as follows: an upper left pixel is pixel 0 (=8×0+0); an upper right pixel is pixel 7 (=8×0+7); a lower left pixel is pixel 56 (=8×7+0); and a lower right pixel is pixel 63 (=8×7+7).

Here, pixel 55 in the example of FIG. 3A have four sub-pixels 55a to 55d with different pixel values. Specifically, the pixel values of upper left sub-pixel 55a, upper right sub-pixel 55b, and lower left sub-pixel 55c are (R, G, B)=(255, 255, 255), whereas the pixel value of lower right sub-pixel 55d is (R, G, B)=(0, 102, 0). It should be noted that in the example of FIG. 3A, the illustration of transparency, depth values, combination completed bits, and write-enable bits is omitted.

On the other hand, pixels 0 and 38 in the example of FIG. 3A each have four sub-pixels with the same pixel value. For example, the pixel values of four sub-pixels of pixel 0 are (R, G, B)=(0, 102, 0), and the pixel values of four sub-pixels of pixel 38 are (R, G, B)=(255, 255, 255).

Specifically, for a pixel value of each of four sub-pixels, image data stored in the first memory 120 includes, for example, information on a color value (1 byte each for RGB and 1 byte for transparency a) and a depth value (4 bytes for Z value), for instance. In Embodiment 1, values calculated using the coordinate position of the center of each pixel are used as a pixel value and a depth value of each sub-pixel. Furthermore, the image data may include a combination completed bit and/or a write-enable bit in addition to a pixel value and a depth value.

In the above example, although a set of information pieces including a color value, a depth value, a combination completed bit, a write-enable bit, and others is included in one sub-pixel, these may be separately stored in different areas. For example, a pixel value and a depth value may be separately processed.

The image processing unit 110 shown in FIG. 2B includes an anti-aliasing unit 114. For example, for each of pixels 0 to 63 shown in FIG. 3A, the anti-aliasing unit 114 mixes sub-pixel values (sub-pixel colors) of the pixel, and determines a pixel value (display pixel value) of the pixel for the display on a display unit 150. Specifically, an image constituted by 16×16 sub-pixels shown in FIG. 3A cannot be displayed on the display unit 150 as it is, and thus sub-pixel values are mixed on a pixel-by-pixel basis, to determine final display pixel values.

Figure 3B:
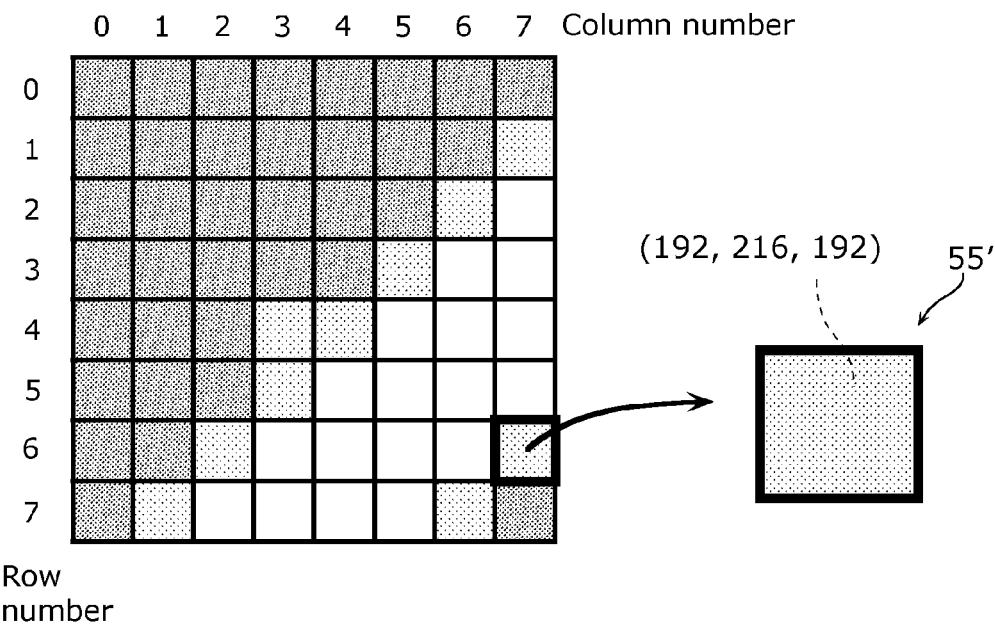
FIG. 3B shows a result of performing anti-aliasing on pixel data in FIG. 3A.

Specifically, the anti-aliasing unit 114 determines display pixel values by averaging pixel values of four sub-pixels for each component. As shown in FIG. 3B, pixel values (R, G, B)=(192, 216, 192) of display pixel 55' are obtained by averaging four sub-pixel values of pixel 55 in FIG. 3A for each of R, G, and B, for example. In contrast, processing of calculating an average of four sub-pixel values for pixels 0, 38, and other pixels having equal sub-pixel values may be skipped, and a given sub-pixel value may be used as a display pixel value. Then, the anti-aliasing unit 114 executes anti-aliasing on all pixels 0 to 63 as shown in FIG. 3B, and outputs the obtained display pixel values to the display unit 150.

The display unit 150 performs display using display pixel values obtained from the image processing unit 110. The specific configuration of the display unit 150 is not particularly limited, and for example, a liquid crystal display, a plasma display, or an organic electroluminescence (EL) display is applicable thereto.

It should be noted that in order for the image processing unit 110 to execute processing as described above, pixel values of all the sub-pixels need to be loaded into the first memory 120. However, the memory capacity of the first memory 120 is typically small, and thus if image data having a large size is processed, it is necessary to leave only data to be immediately accessed in the first memory 120, and save the remaining data into the second memory 140.

Figure 4:
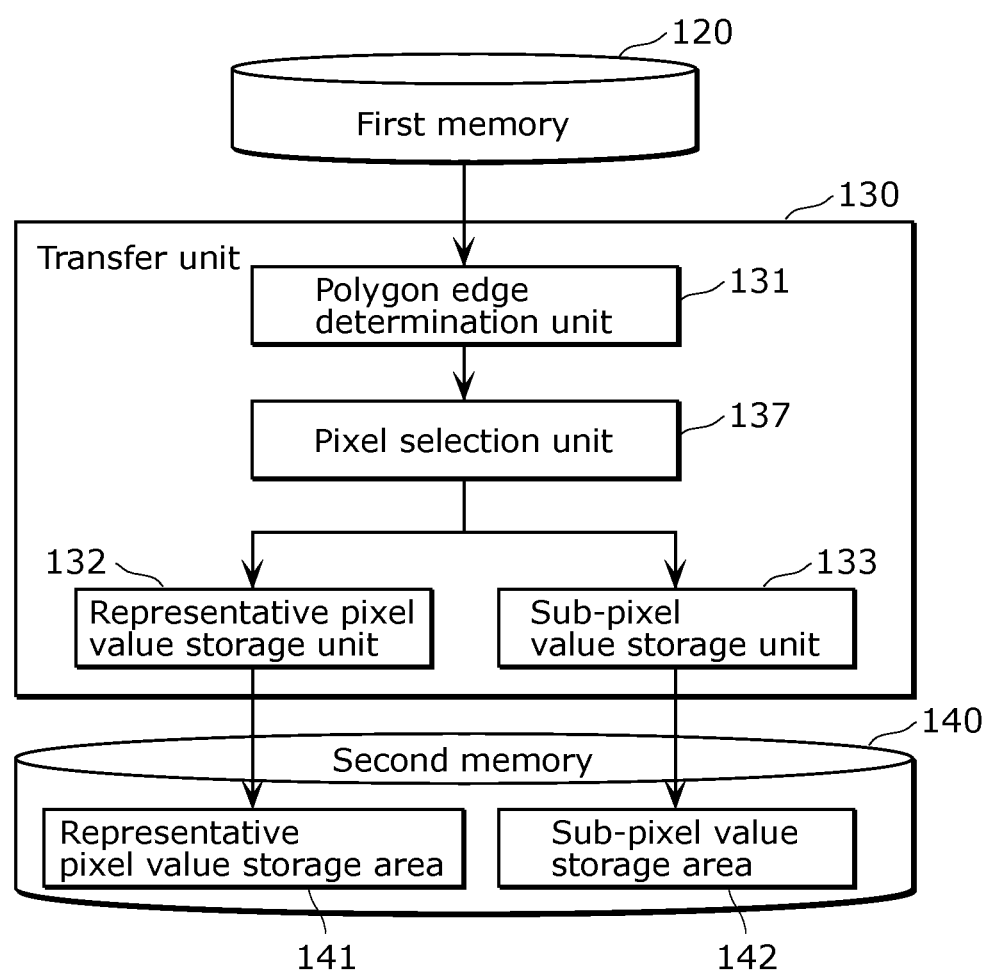
FIG. 4 shows an example of a specific configuration of a transfer unit.
Figure 5:
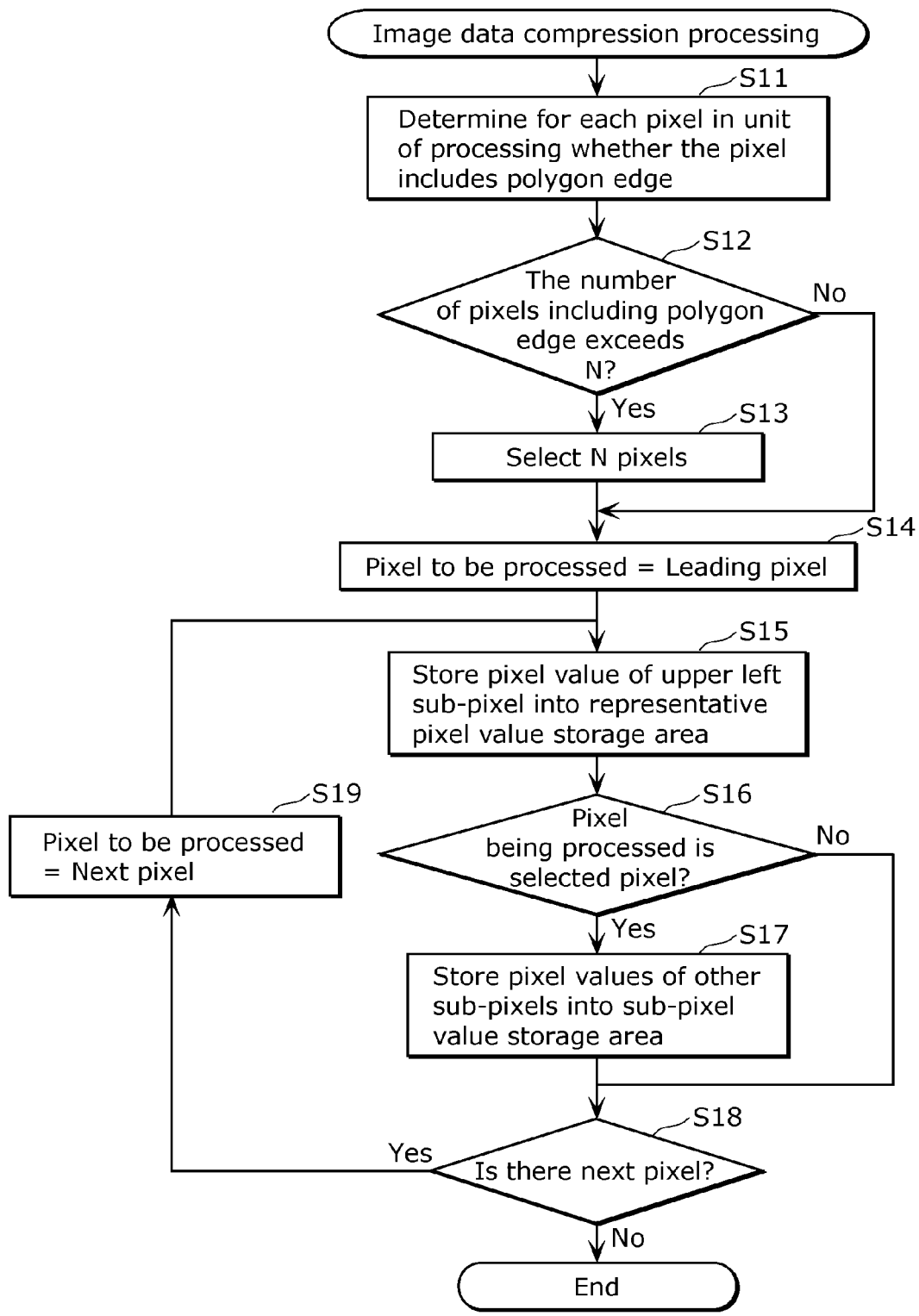
FIG. 5 is a flowchart showing steps of processing by the transfer unit in FIG. 4.

Now, a description is given of an example of specific processing by the transfer unit 130, with reference to FIGS. 4 and 5. FIG. 4 is a block diagram showing the configuration of the transfer unit 130 for transferring image data from the first memory 120 to the second memory 140. FIG. 5 is a flowchart showing steps of processing (image data compression processing) for transferring image data from the first memory 120 to the second memory 140. The transfer unit 130 shown in FIG. 4 mainly includes a polygon edge determination unit 131, a pixel selection unit 137, a representative pixel value storage unit 132, and a sub-pixel value storage unit 133.

It should be noted that the polygon edge determination unit 131 corresponds to the edge determination unit 11 in FIG. 1A, the representative pixel value storage unit 132 corresponds to the representative pixel value storage unit 12 in FIG. 1A, and the sub-pixel value storage unit 133 corresponds to the sub-pixel value storage unit 13 in FIG. 1A.

The polygon edge determination unit 131 determines, for each of plural pixels in one unit of processing, whether the pixel includes a polygon edge (S11). In the examples below, the unit of processing for the polygon edge determination unit 131 is assumed to be 8×8 pixels (64 pixels in total).

Figure 6A:
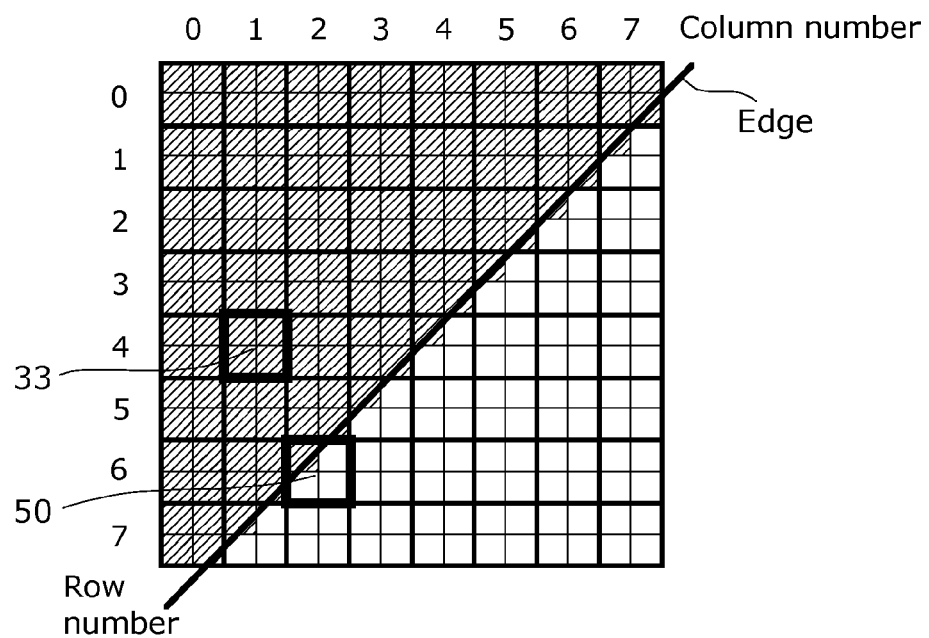
FIG. 6A shows an example of image data used in polygon edge determination processing.

FIG. 6A shows 8×8 pixels (16×16 sub-pixels) which constitute one unit of processing received by the polygon edge determination unit 131, and a polygon edge extending from the upper right to the lower left (indicated by "Edge" in the drawings). In FIG. 6A, one pixel includes 2×2 sub-pixels, and shaded sub-pixels are sub-pixels present inside a polygon, whereas unshaded sub-pixel are sub-pixels outside the polygon. Upon receipt of image data constituted by 16×16 sub-pixels, the polygon edge determination unit 131 determines, for each pixel, whether the pixel includes the polygon edge.

A polygon edge means a side of a polygon (triangle) in 3D graphics. Some of the sub-pixels included in image data in FIG. 6A include a polygon edge. For example, pixel 33 does not include the polygon edge, whereas pixel 50 includes the polygon edge.

There are various methods for the polygon edge determination unit 131 to determine for each pixel whether the pixel includes a polygon edge. One of such methods is to make a determination according to whether there is a difference (color difference) between pixel values of sub-pixels in the same pixel, when only a pixel value and/or a depth value are used for the determination. Regarding pixels which do not include a polygon edge, all the pixel values or depth values of sub-pixels in the same pixel should be the same (color difference=0). In contrast, regarding pixels which include a polygon edge, one or more sub-pixels each having a pixel value different from those of other sub-pixels should be present in the same pixel (color difference≠0). A polygon edge determination can be made by using such a feature.

It should be noted that when a determination is made using a color difference as to whether a pixel includes a polygon edge, it may be determined that a pixel including sub-pixels having the greatest color difference smaller than or equal to a predetermined threshold value does not include a polygon edge, and a pixel including sub-pixels having the greatest color difference exceeding the threshold value includes a polygon edge. A color difference can be obtained by, for example, calculating, for each component, a difference between pixel values of two sub-pixels in the same pixel, and adding the absolute values of the calculated differences. Also, a value of the greatest color difference between two sub-pixels among all the combinations of sub-pixels in the same pixel can be defined as a greatest color difference.

Further, a write-enable bit can also be used for determination as a method for determining for each pixel whether the pixel includes a polygon edge. Specifically, if the values of write-enable bits are different between sub-pixels in the same pixel, the polygon edge determination unit 131 may determine that a polygon edge is present in the pixel.

On the other hand, if the write-enable bits of all the sub-pixels in the same pixel are set to the same value, or in other words, if the write-enable bits in the same pixel all indicate "able" (the third value) or "unable" (the fourth value), a polygon edge is not be present in the pixel. If all the write-enable bits indicate "unable", this indicates that all the sub-pixels in the same pixel are not write-enabled, and a rendered polygon itself is not present, whereas if all the write-enable bits indicate "able", this indicates that all the sub-pixels in the same pixel are write-enabled, and the rendered polygon is over that pixel.

Figure 6B:
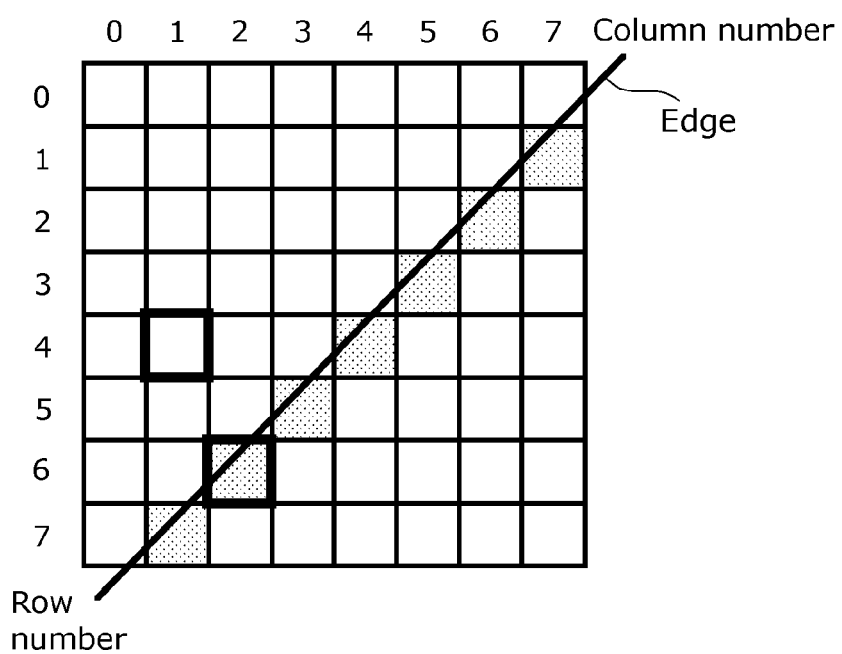
FIG. 6B shows a result of performing polygon edge determination processing on the image data in FIG. 6A.

As a result, it is determined for each pixel whether the pixel includes a polygon edge, and as shown in FIG. 6B, pixels can be classified into shaded pixels which include a polygon edge and unshaded pixels which do not include a polygon edge. The polygon edge determination unit 131 determines, for each pixel, whether the pixel includes a polygon edge, and transfers 8×8-pixel image data which is one unit of processing and information indicating whether each pixel includes a polygon edge to the pixel selection unit 137, the representative pixel value storage unit 132, and the sub-pixel value storage unit 133.

The "edge" in step S11 is not limited to a polygon edge, and any type of edge can be set as a predetermined edge. For example, the contour of an image may be set as a predetermined edge, or a line obtained by connecting points at which a luminance gradient exceeds a predetermined threshold value may be set as a predetermined edge.

Next, the pixel selection unit 137 determines whether the number of pixels determined by the polygon edge determination unit 131 to include a polygon edge exceeds N (N is a natural number) (S12). The value of N may be a fixed value assigned to the image processing device 100 according to the capacity of the first memory 120, or may be a value dynamically changed according to the size of an image to be subjected to image processing, for example. The following examples will be described assuming that N is 16.

If the number of pixels determined to include a polygon edge exceeds 16 (Yes in S12), the pixel selection unit 137 selects 16 pixels from among pixels determined to include a polygon edge (S13). If the number of pixels determined to include a polygon edge is 16 or less (No in S12), the pixel selection unit 137 selects all the pixels determined to include a polygon edge.

As a criterion for selecting 16 pixels, the 16 pixels may be selected from among pixels determined to include a polygon edge, in descending order of a greatest color difference between sub-pixels. It should be noted that in the example in FIG. 7A, a difference between sub-pixels is calculated for each component, the squares of the calculated differences are added, and the greatest value of the square roots of the obtained results is used as a greatest color difference.

As shown by the pattern (A) in FIG. 7A, a pixel with a large, greatest color difference includes sub-pixels having a large difference in color. Furthermore, there is a tendency that the smaller a greatest color difference is (the order of patterns (A), (B), and (C)), the smaller a color difference between sub-pixels is. In view of this, it is preferable to preferentially store pixel values of sub-pixels included in a pixel in which sub-pixels have a great color difference when image data is transferred from the first memory 120 to the second memory 140. Regarding a pixel which includes sub-pixels having a small color difference, it is conceivable that the lack of a pixel value of one or more of sub-pixels is less likely to give influence on image quality.

It should be noted that the criterion by which the pixel selection unit 137 selects 16 pixels is not limited to the above. For example, the pixel selection unit 137 may select 16 pixels in descending order of a greatest difference in depth value between sub-pixels, from among pixels determined to include a polygon edge. It should be noted that in the example in FIG. 7B, a greatest value of a difference in depth value between sub-pixels is used as a greatest difference in depth value. Further, regarding depth values in FIG. 7B, a depth value at a view position is 0.0, and a depth value at a position most distant from the view position is 1.0.

As shown by the pattern (A) in FIG. 7B, a pixel having a large, greatest difference in depth value represents a pixel including sub-pixels distant from one another in the depth direction. Specifically, there is a high possibility that a correlation between sub-pixels is low, and the color difference between sub-pixels is large. In contrast, there is a tendency that the smaller the greatest difference in depth value is (the order of patterns (A), (B), and (C)), the smaller the color difference between sub-pixels is. In view of this, as with the case of a greatest color difference, it is preferable to preferentially store pixel values of sub-pixels included in a pixel in which sub-pixels have a large, greatest difference in depth value.

Figure 16:
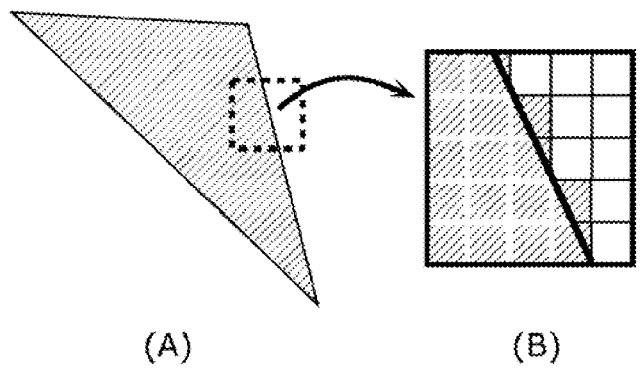
FIG. 16 illustrates an example of occurrence of jaggies.

It should be noted that in the examples in FIGS. 7A and 7B, 16 pixels are selected according to a criterion based on a greatest color difference or a greatest difference in depth value, and both a color value and a depth value of each sub-pixel other than a representative sub-pixel included in each of the selected pixels are stored into a representative pixel value storage area 141. However, the present invention is not limited to this, and a pixel having a color value and a pixel having a depth value may be separately selected.

Specifically, the pixel selection unit 137 selects 16 pixels in descending order of a greatest color difference between sub-pixels, from among pixels determined by the polygon edge determination unit 131 to include a polygon edge. Similarly, the pixel selection unit 137 selects 16 pixels from among pixels determined by the polygon edge determination unit 131 to include a polygon edge, in descending order of a greatest difference in depth value between sub-pixels.

It should be noted that 16 pixels selected in descending order of a greatest color difference may be all the same as, or different in part from, or even completely different from 16 pixels selected in descending order of a greatest difference in depth value. Thus, the pixel selection unit 137 selects pixels twice based on different selection criteria (a greatest color difference and a greatest difference in depth value).

In addition, the sub-pixel value storage unit 133 may store, into different areas in a sub-pixel value storage area 142, color values of sub-pixels other than representative sub-pixels of 16 pixels each having a large, greatest color difference selected by the pixel selection unit 137, and depth values of sub-pixels other than representative sub-pixels of 16 pixels each having a large, greatest difference in depth value selected by the pixel selection unit 137.

Further, although the above is an example in which the pixel selection unit 137 selects 16 pixels from among all the pixels determined by the polygon edge determination unit 131 to include a polygon edge, the selection is not limited to this. For example, the pixel selection unit 137 may select 16 pixels from among pixels determined by the polygon edge determination unit 131 to include a polygon edge and each associated with a combination completed bit set to the second value (value indicating that pixel values of sub-pixels are not mixed).

When a combination completed bit is set to the first value (value indicating that pixel values of sub-pixels are mixed), pixel values of sub-pixels included in a pixel are not (original) values when the pixel is used for rendering. Thus, even storing pixel values of all the sub-pixels included in such a pixel into the sub-pixel value storage area 142 does not prevent deterioration of image quality. Thus, it is preferable to select 16 pixels from among pixels which include sub-pixels having values at the time of rendering.

Next, the transfer unit 130 extracts a leading pixel (pixel 0) in a unit of processing, as a pixel to be processed (S14). The following processing (S15 to S19) is for the transfer from the first memory 120 to the second memory 140 for each pixel.

The representative pixel value storage unit 132 selects one of plural sub-pixels included in a pixel being processed, as a representative sub-pixel. Then, the representative pixel value storage unit 132 stores a representative pixel value which is a pixel value of the selected representative sub-pixel, into the representative pixel value storage area 141 of the second memory 140 (S15). In the example below, a description is given assuming a sub-pixel at the upper left of each pixel as a representative sub-pixel. It should be noted that the representative pixel value storage area 141 may store, in addition to a pixel value of a representative sub-pixel (namely, a color value and a depth value), a value of a combination completed bit associated with a pixel including that representative sub-pixel, for example.

Next, the sub-pixel value storage unit 133 checks whether the pixel being processed is a pixel selected by the pixel selection unit 137 (S16). Then, if the pixel being processed is a selected pixel (Yes in S16), the sub-pixel value storage unit 133 stores pixel values (namely, color values and depth values) of sub-pixels (an upper right sub-pixel, a lower left sub-pixel, and a lower right sub-pixel) other than the representative sub-pixel selected by the representative pixel value storage unit 132, into the sub-pixel value storage area 142 of the second memory 140 (S17).

Then, if there is an unprocessed pixel (Yes in S18), the transfer unit 130 extracts the next pixel as a pixel to be processed (S19), and repeatedly executes the processing of steps S15 to S17 on all the pixels in the unit of processing.

Figure 8A:
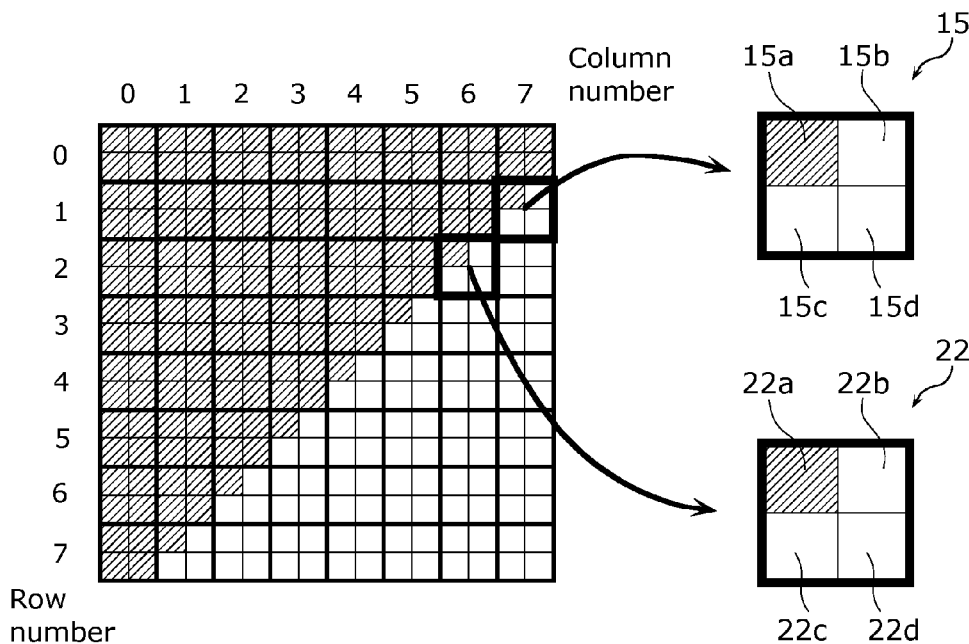
FIG. 8A shows in detail pixels each including a polygon edge.
Figure 8B:
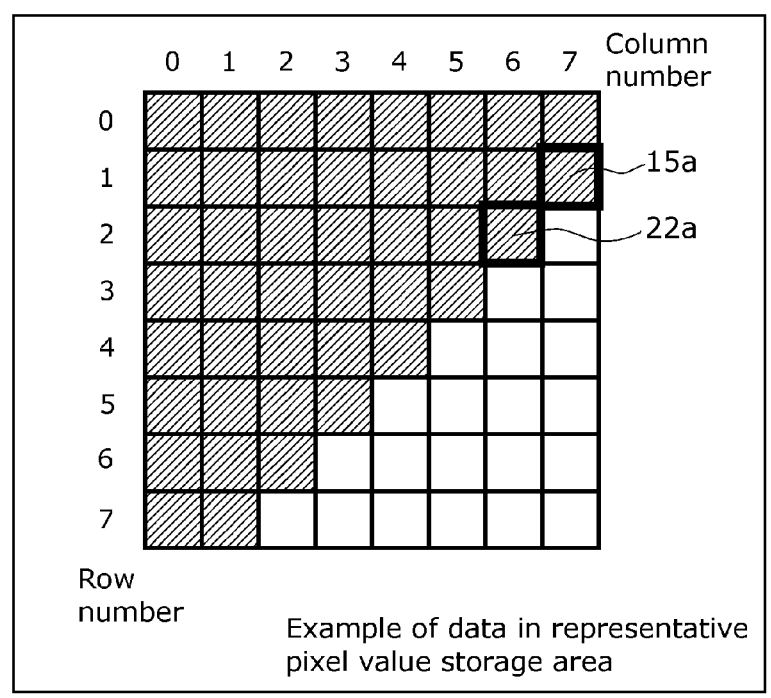
FIG. 8B shows an example of data stored in a representative pixel value storage area.

FIG. 8A shows an example of image data stored in the first memory 120. FIG. 8B shows an example of data stored in the representative pixel value storage area 141 of the second memory 140. FIG. 8C shows an example of data stored in the sub-pixel value storage area 142 of the second memory 140.

Pixel position IDs 0 to 63 indicating pixel positions are given to pixels in the representative pixel value storage area 141 shown in FIG. 8B. Entry IDs 0 to 15 where sub-pixels can be stored are given to the sub-pixel value storage area 142 shown in FIG. 8C.

In FIG. 8C, the maximum number of entries which can be stored in the sub-pixel value storage area 142 is for only 16 pixels out of 8×8 pixels in total. Further, in Embodiment 1, each pixel includes four sub-pixels, one of the sub-pixels is selected as a representative sub-pixel, and a pixel value of the selected representative sub-pixel is stored as a representative sub-pixel value into the representative pixel value storage area 141. Three sub-pixels other than the representative sub-pixel, and a pixel position ID indicating a location of a pixel including the sub-pixels among 8×8 pixels are stored in a null entry of the sub-pixel value storage area 142.

Specifically, the representative pixel value storage unit 132 stores pixel values of upper left sub-pixels of pixels 0 to 63 shown in FIG. 8A, as representative pixel values, into the representative pixel value storage area 141 of the second memory 140.

The sub-pixel value storage unit 133 previously initializes pixel position IDs of 16 entries of the sub-pixel value storage area 142 to −1. "−1" is defined as a value indicating that an entry is invalid (null entry), and the IDs are initialized to that value. Of course, entry valid bits corresponding to entries may be added, and all valid bits may be invalidated at the time of initialization.

In the example of FIG. 8A, pixel 15 including a polygon edge includes values (pixel values, depth values) of 2×2 sub-pixels, and is a pixel with pixel position ID 15, having pixel values of upper left sub-pixel 15a, upper right sub-pixel 15b, lower left sub-pixel 15c, and lower right sub-pixel 15d.

The representative pixel value storage unit 132 selects upper left sub-pixel 15a as a representative sub-pixel of pixel 15, and stores a pixel value of sub-pixel 15a at the pixel position (pixel position ID=15) of the representative pixel value storage area 141. Further, the sub-pixel value storage unit 133 stores pixel values of upper right sub-pixel 15b, lower left sub-pixel 15c, and lower right sub-pixel 15d other than the representative sub-pixel into a null entry (entry ID=0) of the sub-pixel value storage area 142, and furthermore, stores pixel position ID=15.

Furthermore, likewise, the representative pixel value storage unit 132 selects, for pixel 22, upper left sub-pixel 22a as a representative sub-pixel, and stores a pixel value of sub-pixel 22a at the pixel position (pixel position ID=22) of the representative pixel value storage area 141. Further, the sub-pixel value storage unit 133 stores pixel values of upper right sub-pixel 22b, lower left sub-pixel 22c, and lower right sub-pixel 22d other than the representative sub-pixel into a null entry (entry ID=1) of the sub-pixel value storage area 142, and furthermore, stores pixel position ID=22.

The transfer unit 130 performs the above processing on all the pixels 0 to 63 in a unit of processing. It should be noted that although the above shows that the upper left sub-pixel is selected as a representative sub-pixel as one example of selecting a representative sub-pixel, the present invention is not limited to this. A lower right sub-pixel may be selected as a representative sub-pixel, rather than an upper left sub-pixel.

Further, a sub-pixel with a depth value having the highest priority and satisfying a Z-test may be selected as a representative sub-pixel. For example, a sub-pixel having the highest priority can be defined as a sub-pixel located closest to a user among four sub-pixels (ZFUNC=LESS: function of selecting a sub-pixel closest to a viewpoint). In the example in FIG. 9A, the depth value and the color value of an upper right sub-pixel are stored as a representative sub-pixel value in the representative pixel value storage area 141.

Further, a sub-pixel furthest from a user among four sub-pixels may be a representative sub-pixel (ZFUNC=GREATER: function of selecting a sub-pixel furthest from a viewpoint). In the example in FIG. 9A, the depth value and the color value of a lower left sub-pixel are stored as a representative sub-pixel value in the representative pixel value storage area 141.

It should be noted that it is necessary to store a positional relationship between three sub-pixels in the sub-pixel value storage area 142 in this case. Any method may be used as long as the method satisfies a condition that the positions of original four sub-pixels can be uniquely reconstructed from a representative sub-pixel and the remaining sub-pixels, based on a pixel position ID.

Further, among four sub-pixels, a sub-pixel associated with a write-enable bit set to the third value (a value indicating that a sub-pixel is used to render a polygon in immediately preceding rendering processing) may be a representative sub-pixel. Specifically, in the pattern (A) of FIG. 9B, the depth value and the color value of an upper right sub-pixel are stored as a representative sub-pixel value in the representative pixel value storage area 141. Likewise, in the pattern (B) of FIG. 9B, the depth value and the color value of an upper left sub-pixel are stored as a representative sub-pixel value in the representative pixel value storage area 141.

A method for selecting a representative sub-pixel shown by patterns (A) and (B) in FIG. 9B is preferably used for a pixel determined by the polygon edge determination unit 131 to include a polygon edge, and associated with a combination completed bit set to the second value (a value indicating that pixel values of sub-pixels are not mixed), for example. In this manner, a pixel value of a sub-pixel used to render a polygon in immediately preceding processing can be stored.

It is more preferable that this method for selecting a representative sub-pixel is used for a pixel determined by the polygon edge determination unit 131 to include a polygon edge, associated with a combination completed bit set to the second value, and not selected by the pixel selection unit 137. At this time, the combination completed bit of such a pixel is set to the first value.

Further, a sub-pixel closest to (furthest from) a user may be a representative sub-pixel among sub-pixels associated with the write-enable bit in which the third value is stored. In pattern (C) in FIG. 9B, among an upper left sub-pixel and a lower right sub-pixel each associated with a write-enable bit set to 1, the depth value and the color value of the upper left sub-pixel located closer to the user are stored as a representative sub-pixel value in the representative pixel value storage area 141.

It should be noted that although the above shows examples in which one of plural sub-pixels included in a pixel is selected as a representative sub-pixel, the selection is not limited to this, and a pixel value of a representative sub-pixel may be newly generated by mixing pixel values of the plural sub-pixels. It should be noted that if pixel values of plural sub-pixels are mixed, a combination completed bit associated with a pixel including the sub-pixels is set to the first value.

For example, an average value of pixel values of sub-pixels may be a pixel value of a representative sub-pixel. More specifically, an average value of color values for each color component and an average value of depth values may be separately calculated, and the average values may be a pixel value of a representative sub-pixel.

It should be noted that pixel values of all the sub-pixels included in each pixel may be used, or pixel values of only some of the sub-pixels may be used for calculation of average values. Specifically, among plural sub-pixels, only pixel values of sub-pixels each associated with a write-enable bit set to the third value may be averaged, to calculate a pixel value of a representative sub-pixel.

Further, an average value may be a simple average or a weighted average (weighted mean). As an example, a depth value of each sub-pixel can be used as a weighting factor. Specifically, a weighting average may be calculated by multiplying a pixel value of a sub-pixel located closer to (further from) a user by a large weighting factor.

It should be noted that whether one of plural sub-pixels is selected as a representative sub-pixel or pixel values of plural sub-pixels are mixed to generate a pixel value of a representative sub-pixel may be equally determined for all the pixels in a unit of processing, or may be differently determined for pixels in a unit of processing.

For example, for a pixel determined by the polygon edge determination unit 131 to include a polygon edge and selected by the pixel selection unit 137, it is preferable to select one of plural sub-pixels as a representative sub-pixel. In contrast, for a pixel determined by the polygon edge determination unit 131 to include a polygon edge and not selected by the pixel selection unit 137, it is preferable to generate a pixel value of a representative sub-pixel by mixing pixel values of plural sub-pixels. Either of the methods may be used for a pixel determined by the polygon edge determination unit 131 not to include a polygon.

If a pixel value of a representative sub-pixel is generated by mixing pixel values of plural sub-pixels, the representative pixel value storage unit 132 sets the combination completed bit of a pixel including the representative sub-pixel to the first value (a value indicating that a pixel value of a representative sub-pixel is generated by mixing pixel values of plural sub-pixels).

It should be noted that in the example in FIG. 8C described so far, although N indicating the number of pixels which can be stored in the sub-pixel value storage area 142 is set to 16, the number is not limited to this, and a given number of pixels can be stored in the sub-pixel value storage area 142. For example, N indicating the number of pixels which can be stored in the sub-pixel value storage area 142 may be 64, which means that all the pixels in a unit of processing can be stored in the sub-pixel value storage area 142 if all the pixels include a polygon edge.

Here, an area in which at least one set corresponding to N number of pixels (N is a natural number) each including a pixel position and sub-pixels other than a representative sub-pixel can be stored may be assigned to the sub-pixel value storage area 142, and furthermore the number of storable pixels N may be limited to less than the number of pixels included in one unit of processing. In this manner, a memory band necessary for transferring image data between the first and second memories 120 and 140 and the capacity of the second memory 140 can be further reduced.

In Embodiment 1, although a description is given of the case where one unit of processing includes 8 pixels in width and 8 pixels in height, that is, 64 pixels in total, and the number of sampling points is four per pixel (2 sub-pixels in width and 2 sub-pixels in height), the present invention is not limited to this.

It should be noted that the image processing unit 110, the transfer unit 130, and all or some of the functional blocks included in the units are typically achieved as an LSI which is an integrated circuit. These may be each formed as a single chip or may be formed as a single chip to include some or all of the blocks. LSI is mentioned here, but it may also be referred to as IC, system LSI, super LSI, or ultra LSI depending on the degree of integration.

Moreover, ways to achieve circuit integration are not limited to the LSI, and a special circuit or a general purpose processor can also be used to achieve the circuit integration. A field programmable gate array (FPGA) that can be programmed after manufacturing LSIs or a reconfigurable processor that allows re-configuration of the connection or setting of a circuit cell inside an LSI may be used.

In addition, if advancement in semiconductor technology or other derivative technology achieves circuit integration technology that replaces LSI, the functional blocks may of course be integrated using such a technology. The present invention may be applied to biotechnology, for instance.

Further, a program which describes the steps described in Embodiment 1 may be stored in a memory, and a central processing unit (CPU) or the like may read the program from the memory, and execute the read program, thereby achieving the above functional blocks. Further, the program which describes the steps may be stored in a recording medium, and the medium may be distributed.

According to such a configuration, assuming that plural pixels constitute one unit of processing, only a pixel value of a representative sub-pixel is stored for a pixel which does not include a polygon edge, whereas pixel values of sub-pixels other than a representative sub-pixel are also stored for a pixel which includes a polygon edge. This allows sub-pixel information to be stored as much as possible, without the necessity of a large capacity memory.

Furthermore, the number of storable sub-pixel information pieces is limited to N which is a predetermined number, thus allowing the memory capacity of the sub-pixel value storage area 142 to be fixed and a necessary memory band and necessary memory capacity to be secured previously, without depending on graphics to render.

Figure 10:
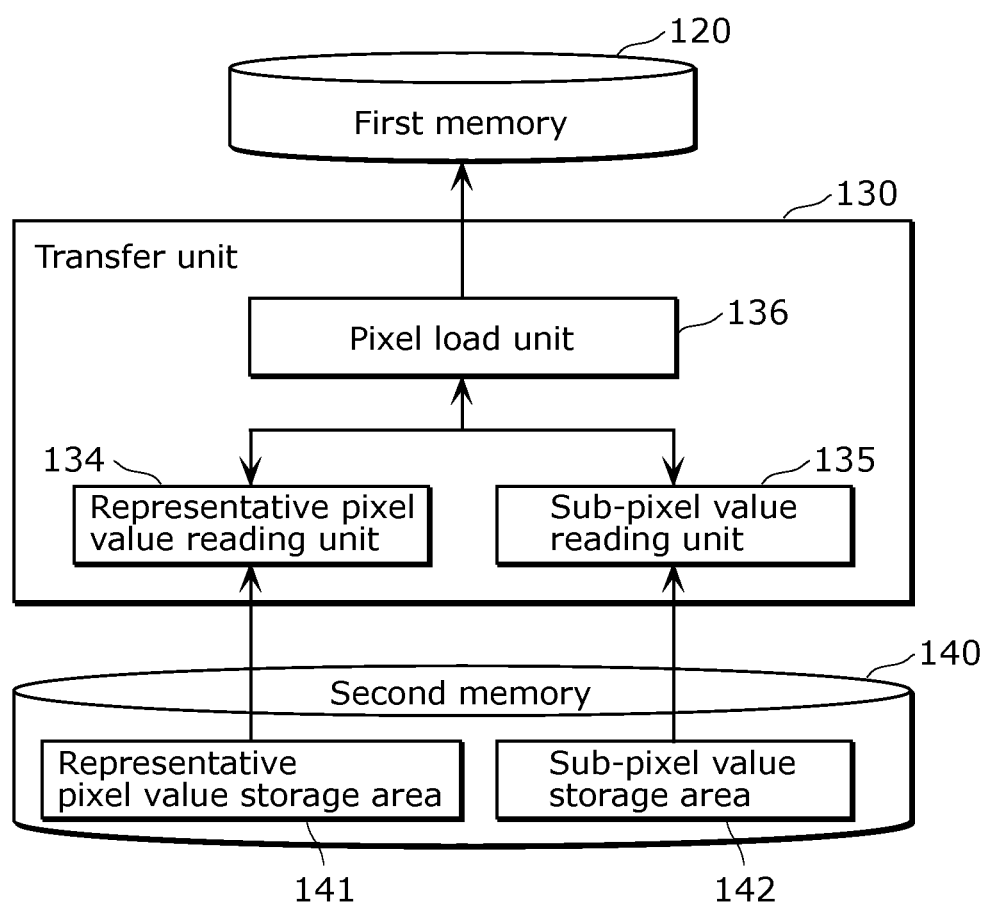
FIG. 10 shows another example of a specific configuration of the transfer unit.

Next, FIG. 10 is a block diagram showing a configuration of the transfer unit 130 for transferring image data from the second memory 140 to the first memory 120. The transfer unit 130 shown in FIG. 10 mainly includes a representative pixel value reading unit 134, a sub-pixel value reading unit 135, and a pixel load unit 136.

It should be noted that the same numerals are used for the same constituent elements as in FIG. 4, and thus a description thereof is omitted. Further, also in this example, one unit of processing includes 8 pixels in width and 8 pixels in height, that is, 64 pixels in total, and the number of sampling points per pixel is 2 sub-pixels in width and 2 sub-pixels in height, that is, 4 sampling points.

The representative pixel value reading unit 134 reads a representative pixel value of each pixel in a unit of processing from the representative pixel value storage area 141. The sub-pixel value reading unit 135 reads, from the sub-pixel value storage area 142, pixel values and pixel positions of sub-pixels other than a representative sub-pixel of each pixel selected by the pixel selection unit 137, when pixel data is transferred from the first memory 120 to the second memory 140.

The pixel load unit 136 generates a pixel value of each pixel in a unit of processing, using a representative pixel value read from the representative pixel value storage area 141 and/or pixel values of sub-pixels other than the representative sub-pixel read from the sub-pixel value storage area 142, and stores image data including the generated pixel values in the first memory 120.

More specifically, the pixel load unit 136 generates a pixel value of a pixel selected by the pixel selection unit 137, using a representative pixel value read by the representative pixel value reading unit 134 and pixel values of sub-pixels other than the representative sub-pixel read by the sub-pixel value reading unit 135, and duplicates the representative pixel value read by the representative pixel value reading unit 134 to each sub-pixel, to generate a pixel value of each pixel not selected by the pixel selection unit 137. Then, the pixel load unit 136 writes image data including the generated pixel values of pixels in the first memory 120.

Figure 11:
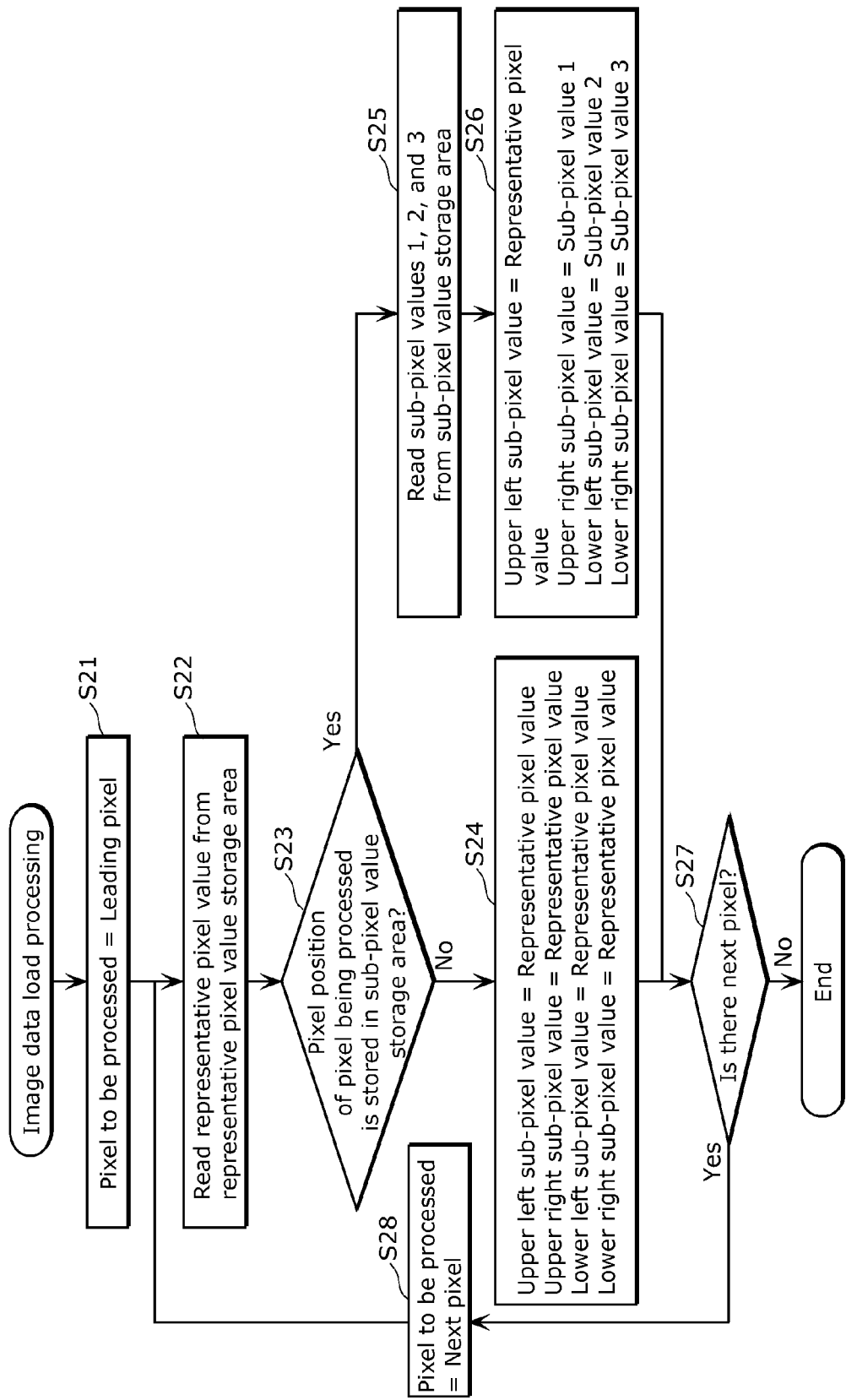
FIG. 11 is a flowchart showing steps of processing by the transfer unit in FIG. 10.

A description is given of operation of the transfer unit 130 shown in FIG. 10, with reference to FIG. 11. FIG. 11 is a flowchart showing steps of processing (image data load processing) for transferring image data from the second memory 140 to the first memory 120.

First, the transfer unit 130 extracts a leading pixel (pixel 0) in a unit of processing as a pixel to be processed (S21). The following processing (S22 to S28) is processing for data transfer from the second memory 140 to the first memory 120 for each pixel.

Figures 12A, 12B:
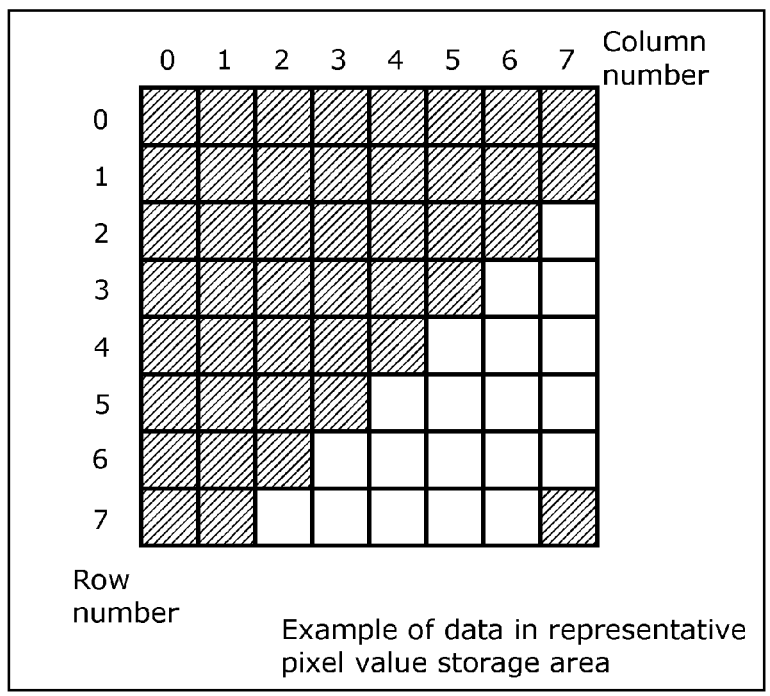
FIG. 12A shows an example of data stored in the representative pixel value storage area.
FIG. 12B shows an example of data stored in the sub-pixel value storage area.

Here, as shown in FIGS. 12A and 12B, 8×8 pixel values of representative sub-pixels are stored in the representative pixel value storage area 141, and sub-pixel information for 16 entries is stored in the sub-pixel value storage area 142. 8×8 representative pixel values and sub-pixel information (each including three sub-pixel values and a pixel position) are assumed to correspond to uniquely determined positions of 8×8 pixels in one unit of processing. Pixel position IDs indicating the positions of 8×8 pixels are represented by 0 to 63, and simultaneously indicate pixel positions of 8×8 representative pixel values. Sub-pixel entry IDs are represented by 0 to 15 each showing a different one of 16 entries of the sub-pixel value storage area 142.

Next, the representative pixel value reading unit 134 reads the representative pixel value of a pixel being processed (pixel 0) from the representative pixel value storage area 141 of the second memory 140 (S22).

Next, the pixel load unit 136 checks whether the pixel position ID (=0) of the pixel being processed is included in any of 16 entries of the sub-pixel value storage area 142 (S23). Here, the case where the pixel position ID of the pixel being processed is stored in the sub-pixel value storage area 142 indicates the case where the pixel being processed is a pixel selected by the pixel selection unit 137. In contrast, the case where the pixel position ID of the pixel being processed is not stored in the sub-pixel value storage area 142 indicates the case where the pixel being processed is not a pixel selected by the pixel selection unit 137.

In the example in FIG. 12B, pixel position IDs in the sub-pixel value storage area 142 do not include pixel position ID 0 of the pixel being processed (No in S23), and thus the pixel load unit 136 generates a pixel value of the pixel being processed using only the representative pixel value read by the representative pixel value reading unit 134. Specifically, the pixel load unit 136 duplicates the representative pixel value to each sub-pixel included in the pixel being processed (S24). Then, the pixel load unit 136 stores the generated pixel value into the first memory 120.

Figure 12C:
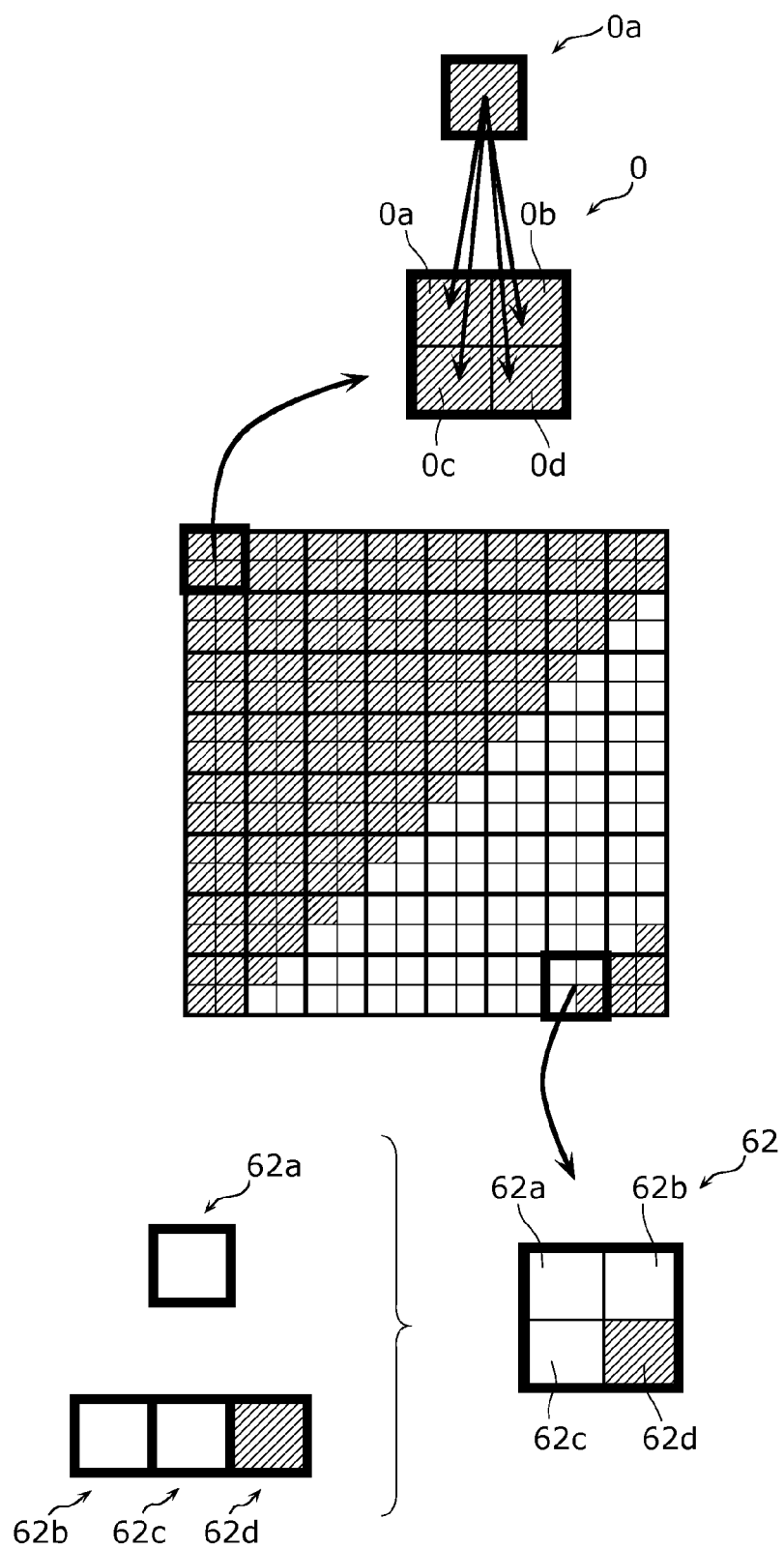
FIG. 12C shows an example of image data loaded by image data load processing.

More specifically, as shown in FIG. 12C, the representative pixel value read by the representative pixel value reading unit 134 is originally a pixel value of upper left sub-pixel 0a. Then, the pixel load unit 136 generates pixel values of upper left sub-pixel 0a, upper right sub-pixel 0b, lower left sub-pixel 0c, and lower right sub-pixel 0d by duplicating the read representative pixel value. Consequently, pixel values of four sub-pixels 0a to 0d are the same.

In contrast, for example, if a pixel being processed is pixel 62, pixel position ID 62 of the pixel being processed is present at entry ID 15 of the sub-pixel value storage area 142 (Yes in S23), and thus the sub-pixel value reading unit 135 reads sub-pixel values 1, 2, and 3 which are pixel values of sub-pixels other than the representative sub-pixel of the pixel being processed from the sub-pixel value storage area 142 of the second memory 140 (S25).

Next, the pixel load unit 136 generates a pixel value of the pixel being processed by combining the representative pixel value read by the representative pixel value reading unit 134 and pixel values of sub-pixels other than the representative sub-pixel read by the sub-pixel value reading unit 135 (S26). Then, the pixel load unit 136 stores the generated pixel value into the first memory 120.

More specifically, as shown in FIG. 12C, the representative pixel value read by the representative pixel value reading unit 134 is originally a pixel value of upper left sub-pixel 62a. Sub-pixel values 1, 2, and 3 read by the sub-pixel value reading unit 135 are originally pixel values of upper right sub-pixel 62b, lower left sub-pixel 62c, and lower right sub-pixel 62d. Now, the pixel load unit 136 places these pixel values at predetermined positions, and generates the pixel value of pixel 62.

Next, the transfer unit 130 checks whether there still is an unprocessed pixel in one unit of processing (S27). In FIG. 11, the processing ends when processing on all the pixels at pixel position IDs 0 to 63 ends (No in S27). It should be noted that the write-enable bits of all the sub-pixels transferred from the second memory 140 to the first memory 120 are initialized to the fourth value (value indicating that the sub-pixels are not used to render a polygon in the immediately preceding rendering processing).

The values prior to the transfer from the first memory 120 to the second memory 140 are held in the combination completed bits of all the sub-pixels transferred from the second memory 140 to the first memory 120. Specifically, in step S22, the representative pixel value reading unit 134 reads the combination completed bit of the pixel being processed from the representative pixel value storage area 141. Further, in steps S24 and S26, the pixel load unit 136 stores the combination completed bit read by the representative pixel value reading unit 134 into the first memory 120.

If there is an unprocessed pixel (Yes in S27), the next pixel is extracted as a pixel to be processed (S28), processing of steps S22 to S26 is executed on all the pixels in a unit of processing. For example, upon the end of processing the pixel at pixel position ID 0 in FIG. 12A, a pixel to be processed is changed to a pixel at next pixel position ID 1, and the processing returns to step S22. Of course, there is no particular limitation to the order in which pixels are scanned, as long as the pixels are in one unit of processing.

According to such a configuration, all sub-pixels are reconstructed uniquely using a representative pixel value stored for each pixel and some of sub-pixel values and pixel positions, thus achieving an image processing device which does not require a large capacity memory when temporarily saving image data.

Embodiment 2

The following describes an image processing device according to Embodiment 2, with reference to FIGS. 13 to 15B. It should be noted that a detailed description of common points to Embodiment 1 is omitted, and a description is given focusing on the differences.

Figure 13:
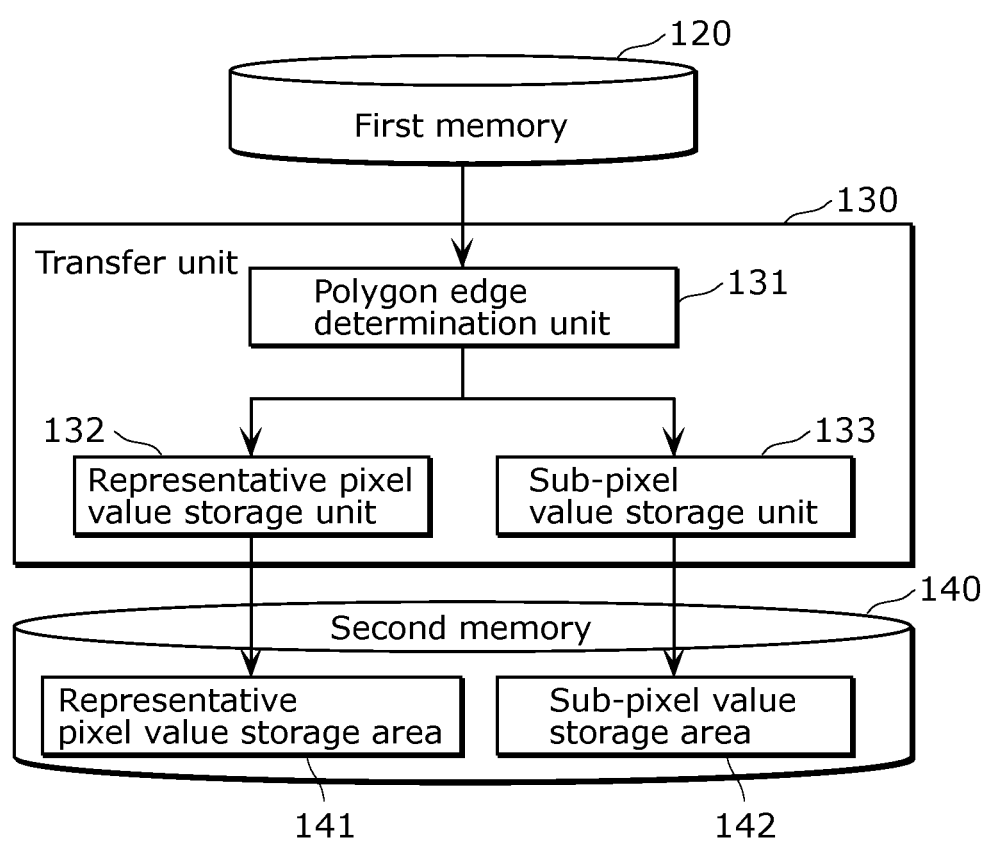
FIG. 13 shows a specific configuration of a transfer unit according to Embodiment 2.

First, FIG. 13 is a block diagram showing a configuration of a transfer unit 130 according to Embodiment 2 for transferring image data from the first memory 120 to the second memory 140. The transfer unit 130 shown in FIG. 13 mainly includes a polygon edge determination unit 131, a representative pixel value storage unit 132, and a sub-pixel value storage unit 133. Thus, the difference from Embodiment 1 is that the pixel selection unit 137 is excluded from FIG. 4.

FIG. 14 is a flowchart showing steps of image data compression processing according to Embodiment 2 for transferring image data from a first memory 120 to a second memory 140. Image data compression processing shown in FIG. 14 is different from Embodiment 1 in that processing of steps S12 and S13 in FIG. 5 is excluded (processing by the pixel selection unit 137). Further, a difference is that it is determined in step S16 in FIG. 5 whether a pixel is selected by the pixel selection unit 137, whereas in step S16 in FIG. 14, it is determined whether a pixel is determined by the polygon edge determination unit 131 to include a polygon edge.

As described above, the image processing device according to Embodiment 2 excludes the pixel selection unit 137, and thus if the number of pixels each including a polygon edge in one unit of processing exceeds the number of pixels which can be stored in a sub-pixel value storage area 142, it is necessary to perform the processing below.

For example, as in FIG. 8C, when N indicating the number of pixels which can be stored in the sub-pixel value storage area 142 is 16 (16 entries), if the number of pixels which include a polygon edge in one unit of processing exceeds 16, an area for storing sets each including a sub-pixel value and a pixel position (collectively referred to as "sub-pixel information") is insufficient, and thus all sub-pixel information pieces cannot be stored.

To address this, the representative pixel value storage unit 132 and/or the sub-pixel value storage unit 133 may adjust, according to the number of pixels each including a polygon edge in one unit of processing, the number of sub-pixel information pieces stored in the sub-pixel value storage area 142 (the number of entries), and the accuracy of pixel values stored in a representative pixel value storage area 141 and/or the sub-pixel value storage area 142. A description is given of the relationship between the accuracy of pixel values stored in the sub-pixel value storage area 142 and the number of sub-pixel information pieces which can be stored in the sub-pixel value storage area 142, using FIGS. 15A and 15B.

Figures 15A, 15B:
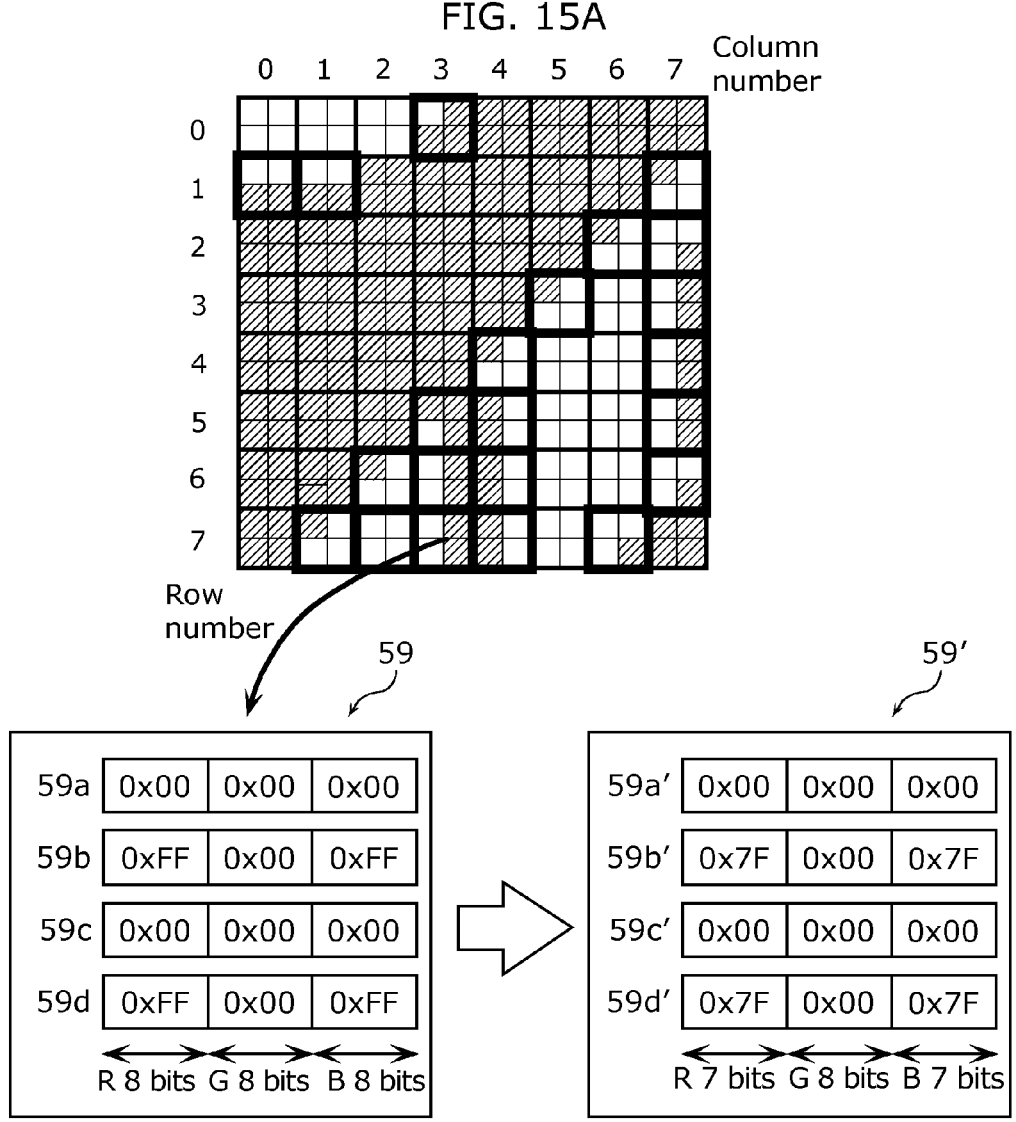
FIG. 15A illustrates an example when many pixels include a polygon edge.
FIG. 15B shows a relationship between the number of pixels each including a polygon edge and accuracy of pixel values stored in the sub-pixel value storage area.

8×8 pixels (16×16 sub-pixels) in a unit of processing shown in FIG. 15A include 21 pixels each including a polygon edge (pixels enclosed with thick line boxes). However, the sub-pixel value storage area 142 can store only 16 sets of information on pixels each including a polygon edge. In view of this, in accordance with the table in FIG. 15B, an amount of data is compressed y lowering the accuracy of stored sub-pixel values, in exchange for increasing the number of pixels stored in the sub-pixel value storage area 142. It should be noted that "to lower the accuracy of pixel values" indicates to eliminate a lower bit of a pixel value, for example.

It should be noted that the table shown in FIG. 15B needs to be common as a system. Specifically, this is because the system needs to know the accuracy of stored pixel values when referring to the representative pixel value storage area 141 and the sub-pixel value storage area 142.

The table shown in FIG. 15B stores pixel values having 8 bits for each of R, G, and B components, without lowering the accuracy of pixel values if one unit of processing includes only 16 pixels or less each including a polygon edge. Further, if a unit of processing includes more than 16 and at most 24 pixels each including a polygon edge, the accuracy of R components and B components is lowered by 1 bit, and thus pixel values are stored which have 7 bits for R component, 8 bits for G component, and 7 bits for B component. Further, if a unit of processing includes more than 24 and at most 32 pixels each including a polygon edge, the accuracy of R components and B components is lowered by 2 bits, and the accuracy of G components is lowered by 1 bit. Consequently, pixel values are stored which have 6 bits for R component, 7 bits for G component, and 6 bits for B component. Furthermore, if a unit of processing includes more than 32 pixels each including a polygon edge, the accuracy of components is set to the same accuracy as the case where the number of such pixels is 32 or less, and the memory area of the sub-pixel value storage area 142 is increased, thereby increasing the number of storable entries.

In the example in FIG. 15A, since the number of pixels each including a polygon edge is 21, all the sub-pixel information pieces can be stored by increasing the number of storable sub-pixel information entries from 16 to 24 in exchange for lowering the accuracy of R and B components by 1 bit, namely, from 8 bits to 7 bits.

For example, for pixel 59 in FIG. 15A, lower 1 bit of each of R and B components of upper right sub-pixel 59b and R and B components of lower right sub-pixel 59d is eliminated. It should be noted that bits eliminated here cannot be reconstructed in image data load processing described below.

In this manner, the accuracy of pixel values is adjusted according to the number of pixels each including a polygon edge, thereby allowing the memory capacity of the sub-pixel value storage area 142 necessary to store one unit of processing to be fixed. As a result, a necessary memory band and necessary memory capacity are previously secured, without depending on graphics to be rendered. Specifically, in the example in FIG. 8B, if there are 32 pixels or less each including a polygon edge, the upper limit of the memory capacity of the sub-pixel value storage area 142 can be made fixed (a smaller amount than an amount for storing all of 8×8 pixels).

It should be noted that a description is given of the case where the accuracy of R and B components is lowered more preferentially than that of G components with an increase in the number of pixels each including a polygon edge, using the example in FIG. 15B. This is because the deterioration of the image quality by lowering the accuracy of G components is more conspicuous than R and B components. Further, it is more preferable to preferentially lower the accuracy of color values (R, G, B) than depth values. However, the present invention is not limited to these.

In addition, although the upper limit of the number of pixels which can be stored according to a fixed memory capacity is 32 in the example in FIG. 15B, the present invention is not limited to this. It is needless to say that the number of entries may be increased by further lowering the accuracy of each color component.

Furthermore, although the accuracy shown in FIG. 15B is reflected only on pixel values stored in the sub-pixel value storage area 142 in the above example, the present invention is not limited to this. The accuracy may be reflected only on pixel values stored in the representative pixel value storage area 141, or on all the pixel values stored in the representative pixel value storage area 141 and the sub-pixel value storage area 142.

If the number of pixels each including a polygon edge exceeds the upper limit (32 in the example in FIG. 15B), the priority for storing a sub-pixel value may be calculated for each pixel, and sub-pixel information on a pixel with a low priority may not be stored in the sub-pixel value storage area 142.

It should be noted that although a method for calculating a priority is not particularly limited, for example, the greatest color difference between sub-pixels of each pixel including a polygon edge may be calculated, and pixels the number of which corresponds to the upper limit (32 pixels in the example in FIG. 8B) may be selected in the descending order of the calculated greatest color difference, and only sub-pixel information of the selected pixels may be stored in the sub-pixel value storage area 142. In this case, sub-pixel information of pixels that are not selected is not stored in the sub-pixel value storage area 142, and only a pixel value of each representative sub-pixel is stored in the representative pixel value storage area 141.

In this case, a pixel value of a representative sub-pixel selected from sub-pixel values may be stored in the representative pixel value storage area 141, or a value obtained by mixing pixel values of sub-pixels may be used as a representative value. It should be noted that a value obtained by mixing may be an average value of pixel values of sub-pixels included in one pixel, for example.

Even in this case, only sub-pixel information pieces the number of which is the upper limit or less may always be stored, and thus the memory capacity of the sub-pixel value storage area 142 necessary for storing one unit of processing can be fixed. As a result, a necessary memory band and necessary memory capacity can be previously secured, without depending on graphics to be rendered.

It should be noted that the configuration of the transfer unit 130 for transferring image data from the second memory 140 to the first memory 120 and image data load processing are the same as those in FIGS. 10 and 11, and thus a detailed description thereof is omitted.

It should be noted that a difference from Embodiment 1 is that in image data load processing according to Embodiment 2, pixel values and pixel positions of sub-pixels stored in the sub-pixel value storage area 142 do not correspond to pixels selected by the pixel selection unit 137 according to Embodiment 1, but correspond to all the pixels determined by the polygon edge determination unit 131 to be pixels each including a polygon edge.

Specifically, a representative pixel value reading unit 134 according to Embodiment 2 reads a representative pixel value of each pixel in a unit of processing from the representative pixel value storage area 141. A sub-pixel value reading unit 135 according to Embodiment 2 reads, from the sub-pixel value storage area 142, pixel values and pixel positions of sub-pixels other than a representative sub-pixel of each pixel which includes a polygon edge.

Further, a pixel load unit 136 according to Embodiment 2 generates a pixel value of a pixel which includes a polygon edge, based on a representative pixel value read by the representative pixel value reading unit 134 and pixel values of sub-pixels other than the representative sub-pixel read by the sub-pixel value reading unit 135, and generates a pixel value of each pixel which does not include a polygon edge by duplicating the representative pixel value read by the representative pixel value reading unit 134 to each sub-pixel. Then, the pixel load unit 136 writes image data including the generated pixel values of pixels into the first memory 120.

Furthermore, the pixel load unit 136 according to Embodiment 2 checks whether any of the 16 entries of the sub-pixel value storage area 142 includes pixel position ID 0 of a pixel being processed. Here, the case where the pixel position ID of the pixel being processed is stored in the sub-pixel value storage area 142 means that the pixel being processed includes a polygon edge, whereas the case where the pixel position ID of the pixel being processed is not stored in the sub-pixel value storage area 142 means that the pixel being processed does not include a polygon edge.

Further, it is needless to say that it is necessary to determine in step S26 in FIG. 11 the accuracy of stored pixel values and the number of entries of sub-pixel information from the table in FIG. 15B, and correct accuracy of (add one or more bits to) each pixel value, and copy a value to which one or more bits are added. "To correct accuracy" here indicates, for example, processing of adding 0 to a lower bit of a pixel value stored in the sub-pixel value storage area 142 (a lower bit indicates "a bit eliminated through accuracy adjustment." The same applies hereinafter). However, a specific example of accuracy correction is not limited to this. For example, 1 may be added to a lower bit and the value of a higher bit may be copied to a lower bit.

It should be noted that in the above embodiments, each of the constituent elements may be constituted by dedicated hardware, or may be obtained by executing a software program suitable for the constituent element. Each constituent element may be obtained by a program execution unit such as a CPU or a processor reading and executing a software program recorded on a recording medium such as a hard disk or semiconductor memory. Here, the software which achieves the image processing device in the above embodiments is a program as described below.

Thus, this program causes a computer to process an image. Specifically, the program causes the computer to execute: (a) determining, for each of plural pixels in a unit of processing, whether the pixel includes a predetermined edge, the plural pixels being included in image data; (b) for each of the plural pixels, selecting one of plural sub-pixels obtained by dividing the pixel, as a representative sub-pixel or generating the representative sub-pixel by mixing pixel values of the plural sub-pixels, and storing, into a representative pixel value storage area, a representative pixel value which is a pixel value of the representative sub-pixel; and (c) storing, into a sub-pixel value storage area, pixel values of two or more of the plural sub-pixels in each of pixels determined in step (a) to include the predetermined edge, the two or more of the plural sub-pixels being other than the representative sub-pixel selected in step (b). The sub-pixel value storage area stores one or more sets corresponding to N number of pixels, the one or more sets each including a pixel position and a pixel value of each sub-pixel other than the representative sub-pixel of a pixel at the pixel position, N being a natural number smaller than a total number of the plural pixels in the unit of processing for the edge determination unit.

The above configurations can be combined where necessary.

Although the above describes embodiments of the invention with reference to the drawings, this invention is not limited to the illustrated embodiments. It is possible to add various revisions and modifications to the illustrated embodiments in the same scope as this invention and the scope of equivalents.

INDUSTRIAL APPLICABILITY

The present invention is useful for image processing by embedded devices which require memory saving and band saving, such as mobile phones and televisions.

REFERENCE SIGNS LIST 10,100,900 Image processing device
11 Edge determination unit
12,132 Representative pixel value storage unit
13,133 Sub-pixel value storage unit
110 Image processing unit
111,902 Coordinates generation unit
112,903 Color value generation unit
113 Effective pixel bit generation unit
114 Anti-aliasing unit
120 First memory
130 Transfer unit
131 Polygon edge determination unit
134 Representative pixel value reading unit
135 Sub-pixel value reading unit
136 Pixel load unit
137 Pixel selection unit
140 Second memory
141 Representative pixel value storage area
142 Sub-pixel value storage area
901 Pixel data generation unit
904 Pixel occupancy generation unit
905 Pixel storage memory
906 Rendering control unit
907 Pixel data combination unit

The invention claimed is:

1. An image processing device for processing pixels in image data, wherein the unit size of the processing is a unit of processing including plural pixels, said image processing device comprising:

an edge determination unit configured to determine, for each of the plural pixels in the unit of processing, whether the pixel includes a predetermined edge;

a representative pixel value storage unit configured to, for each of the plural pixels, select one of plural sub-pixels obtained by dividing the pixel, as a representative sub-pixel, and store, into a representative pixel value storage area, a representative pixel value which is a pixel value of the representative sub-pixel; and a sub-pixel value storage unit configured to store, into a sub-pixel value storage area, pixel values of two or more of the plural sub-pixels in each of pixels determined by the edge determination unit to include the predetermined edge, the two or more of the plural sub-pixels being other than the representative sub-pixel selected by the representative pixel value storage unit, wherein the sub-pixel value storage area stores one or more sets corresponding to N number of pixels, the one or more sets each including a pixel position and a pixel value of each sub-pixel other than the representative sub-pixel of a pixel at the pixel position, N being a natural number greater than zero and smaller than a total number of the plural pixels in the unit of processing for the edge determination unit.

2. The image processing device according to claim 1, further comprising:

a first memory which stores, as image data, pixel values of plural sub-pixels obtained by dividing each of pixels included in an image;

a second memory which includes the representative pixel value storage area and the sub-pixel value storage area;

an image processing unit configured to perform image processing on the image data stored in the first memory; and a transfer unit configured to transfer at least a portion of the image data stored in the first memory between the first memory and the second memory, the transfer unit including:
the edge determination unit;
the representative pixel value storage unit; and
the sub-pixel value storage unit.

3. The image processing device according to claim 1, wherein the edge determination unit is configured to calculate a total number of the pixels in the unit of processing that include the predetermined edge, and the sub-pixel value storage unit is configured to increase N, with an increase in the total number of the pixels calculated by the edge determination unit, in exchange for decreasing a total number of bits in each pixel value to be stored in at least one of the representative pixel value storage area or the sub-pixel value storage area, N indicating a total number of pixels that the sub-pixel value storage area is able to store.

4. The image processing device according to claim 1, further comprising a pixel selection unit configured to select N pixels from among the pixels determined to include the predetermined edge, when the edge determination unit has determined that more than N pixels include the predetermined edge, wherein for each of one or more pixels that are not selected as the N pixels by the pixel selection unit from among the more than N pixels, the representative pixel value storage unit is configured to generate the representative sub-pixel by mixing pixel values of the plural sub-pixels, and store a pixel value of the generated representative sub-pixel into the representative pixel value storage area, and for each of the N pixels selected by the pixel selection unit, the sub-pixel value storage unit is configured to store the pixel value of each sub-pixel other than the representative sub-pixel of the pixel into the sub-pixel value storage area.

5. The image processing device according to claim 4, wherein the pixel selection unit is configured to calculate, for each of the pixels determined by the edge determination unit to include the predetermined edge, a greatest color difference between the sub-pixels included in the pixel, and select N pixels in descending order of the calculated greatest color difference.

6. The image processing device according to claim 4, wherein the pixel value of each of the sub-pixels includes a color value indicating a color of a pixel which includes the sub-pixel, and a depth value indicating a position of the sub-pixel in a depth direction, and the pixel selection unit is configured to select N pixels from among the pixels determined by the edge determination unit to include the predetermined edge, in descending order of a greatest difference in the depth value between the sub-pixels.

7. The image processing device according to claim 4, wherein the pixel value of each of the sub-pixels includes a color value indicating a color of a pixel which includes the sub-pixel, and a depth value indicating a position of the sub-pixel in a depth direction, the pixel selection unit is configured to, for each of the pixels determined by the edge determination unit to include the predetermined edge, calculate a greatest color difference between the sub-pixels included in the pixel, select N pixels in descending order of the calculated greatest color difference, and select N pixels from among the pixels determined by the edge determination unit to include the predetermined edge, in descending order of a greatest difference in the depth value between the sub-pixels, and the sub-pixel value storage unit is configured to store, into different areas of the sub-pixel value storage area, a color value of each sub-pixel other than the representative sub-pixel of each of the N pixels selected by the pixel selection unit in descending order of the greatest color difference, and a depth value of each sub-pixel other than the representative sub-pixel of each of the N pixels selected by the pixel selection unit in descending order of the greatest difference in the depth value.

8. The image processing device according to claim 4, wherein each of pixels included in the image data is associated with a combination completed bit set to one of a first value and a second value, the first value indicating that the representative sub-pixel has been generated by mixing pixel values of plural sub-pixels included in the pixel, the second value indicating that pixel values of plural sub-pixels included in the pixel are not yet mixed, and the pixel selection unit is configured to select N pixels from among pixels determined by the edge determination unit to include the predetermined edge and associated with the combination completed bit set to the second value.

9. The image processing device according to claim 8, further comprising:

a first memory which stores, as image data, the pixel values of the sub-pixels obtained by dividing each of the pixels included in the image; and an image processing unit configured to perform image processing on the image data stored in the first memory, wherein for each of the sub-pixels, the first memory further stores a write-enable bit set to one of a third value and a fourth value, the third value indicating that the sub-pixel is used to render a polygon in immediately preceding rendering processing by the image processing unit, the fourth value indicating that the sub-pixel is not used to render a polygon in the immediately preceding rendering processing by the image processing unit, and for each of the pixels determined by the edge determination unit to include the predetermined edge and associated with the combination completed bit set to the second value, the representative pixel value storage unit is configured to select a sub-pixel associated with the write-enable bit set to the third value as the representative sub-pixel, from among plural sub-pixels included in the pixel, or generate the representative sub-pixel by mixing pixel values of sub-pixels each associated with the write-enable bit set to the third value.

10. The image processing device according to claim 9, wherein the representative pixel value storage unit is configured to set, to the first value, the combination completed bit of a pixel determined by the edge determination unit to include the predetermined edge and not selected by the pixel selection unit.

11. The image processing device according to claim 1, wherein the edge determination unit is configured to calculate, for each of the plural pixels in the unit of processing, a greatest color difference between the sub-pixels included in the pixel, and determine a pixel, for which the calculated greatest color difference exceeds a threshold value, as being a pixel that includes the predetermined edge.

12. The image processing device according to claim 1, further comprising:

a first memory which stores, as image data, pixel values of plural sub-pixels obtained by dividing each of pixels included in an image; and an image processing unit configured to perform image processing on the image data stored in the first memory, wherein for each of the sub-pixels, the first memory further stores a write-enable bit set to one of a first value and a second value, the first value indicating that the sub-pixel is used for rendering in immediately preceding rendering processing by the image processing unit, the second value indicating that the sub-pixel is not used for rendering in the immediately preceding rendering processing by the image processing unit, and the edge determination unit is configured to determine, among the plural pixels in the unit of processing, a pixel including sub-pixels associated with the write-enable bits having different values to include the predetermined edge.

13. The image processing device according to claim 4, wherein the pixel value of each sub-pixel includes a color value indicating a color of a pixel which includes the sub-pixel, and a depth value indicating a position of the sub-pixel in a depth direction, and the representative pixel value storage unit is configured to select or generate the representative sub-pixel of each of the plural pixels, based on a difference in the depth value between the sub-pixels included in the pixel.

14. The image processing device according to claim 2, wherein the image processing unit is configured to:
perform anti-aliasing on the image data stored in the first memory,
perform processing to newly create the image data, and
perform processing of editing an image represented by the image data.

15. The image processing device according to claim 2, wherein the transfer unit further includes:
a representative pixel value reading unit configured to read, from the representative pixel value storage area of the second memory, the representative pixel value of each of the plural pixels in the unit of processing;
a sub-pixel value reading unit configured to read, from the sub-pixel value storage area of the second memory, the pixel value of each sub-pixel other than the representative sub-pixel of each pixel determined to include the predetermined edge; and
a pixel load unit configured to generate a pixel value of each pixel including the predetermined edge, from the representative pixel value read by the representative pixel value reading unit and the pixel value of each sub-pixel other than the representative sub-pixel read by the sub-pixel value reading unit, generate a pixel value of each of pixels determined not to include the predetermined edge, by duplicating the representative pixel value read by the representative pixel value reading unit to each sub-pixel, and write image data including the generated pixel values of the pixels into the first memory.

16. The image processing device according to claim 15, wherein each of the pixels included in the image is associated with a combination completed bit set to one of a first value and a second value, the first value indicating that the representative sub-pixel has been generated by mixing pixel values of plural sub-pixels included in the pixel, the second value indicating that pixel values of plural sub-pixels included in the pixel are not yet mixed,
for each of the sub-pixels, the first memory further stores a write-enable bit set to one of a third value and a fourth value, the third value indicating that the sub-pixel is used for rendering in immediately preceding rendering processing by the image processing unit, the fourth value indicating that the sub-pixel is not used for rendering in the immediately preceding rendering processing by the image processing unit, and
the image processing unit is configured to set, to the second value, the combination completed bit of a pixel including sub-pixels each having the write-enable bit set to the third value, after rendering processing.

17. The image processing device according to claim 1, wherein the predetermined edge is a polygon edge.

18. An image processing method for processing pixels in image data, wherein the unit size of the processing is a unit of processing including plural pixels, said image processing method comprising:
(a) determining with a processor, for each of the plural pixels in the unit of processing, whether the pixel includes a predetermined edge;
(b) for each of the plural pixels, selecting, with the processor one of plural sub-pixels obtained by dividing the pixel, as a representative sub-pixel, and storing, into a representative pixel value storage area, a representative pixel value which is a pixel value of the representative sub-pixel; and
(c) storing with the processor, into a sub-pixel value storage area, pixel values of two or more of the plural sub-pixels in each of pixels determined in step (a) to include the predetermined edge, the two or more of the plural sub-pixels being other than the representative sub-pixel selected in step (b),
wherein the sub-pixel value storage area stores one or more sets corresponding to N number of pixels, the one or more sets each including a pixel position and a pixel value of each sub-pixel other than the representative sub-pixel of a pixel at the pixel position, N being a natural number greater than zero and smaller than a total number of the plural pixels in the unit of processing for the predetermined edge unit.

19. A non-transitory computer-readable recording medium storing a program for causing a computer to execute an image processing method for processing pixels in image data, wherein the unit size of the processing is a unit of processing including plural pixels, the method comprising:
(a) determining, for each of the plural pixels in the unit of processing, whether the pixel includes a predetermined edge;
(b) for each of the plural pixels, selecting one of plural sub-pixels obtained by dividing the pixel, as a representative sub-pixel, and storing, into a representative pixel value storage area, a representative pixel value which is a pixel value of the representative sub-pixel; and
(c) storing, into a sub-pixel value storage area, pixel values of two or more of the plural sub-pixels in each of pixels determined in step (a) to include the predetermined edge, the two or more of the plural sub-pixels being other than the representative sub-pixel selected in step (b),
wherein the sub-pixel value storage area stores one or more sets corresponding to N number of pixels, the one or more sets each including a pixel position and a pixel value of each sub-pixel other than the representative sub-pixel of a pixel at the pixel position, N being a natural number greater than zero and smaller than a total number of the plural pixels in the unit of processing for the predetermined edge unit.

20. An integrated circuit for processing pixels in image data, wherein the unit size of the processing is a unit of processing including plural pixels, said integrated circuit comprising:
an edge determination unit configured to determine, for each of the plural pixels in the unit of processing, whether the pixel includes a predetermined edge;
a representative pixel value storage unit configured to, for each of the plural pixels, select one of plural sub-pixels obtained by dividing the pixel, as a representative sub-pixel, and store, into a representative pixel value storage area, a representative pixel value which is a pixel value of the representative sub-pixel; and
a sub-pixel value storage unit configured to store, into a sub-pixel value storage area, pixel values of two or more of the plural sub-pixels in each of pixels determined by the edge determination unit to include the predetermined edge, the two or more of the plural sub-pixels being other than the representative sub-pixel selected by the representative pixel value storage unit,
wherein the sub-pixel value storage area stores one or more sets corresponding to N number of pixels, the one or more sets each including a pixel position and a pixel value of each sub-pixel other than the representative sub-pixel of a pixel at the pixel position, N being a natural number greater than zero and smaller than a total number of the plural pixels in the unit of processing for the predetermined edge unit.

21. An image processing device for processing pixels in image data, wherein the unit size of the processing is a unit of processing including plural pixels, said image processing device comprising:
- a representative pixel value storage unit configured to, for each of the plural pixels in the unit of processing, select one of plural sub-pixels obtained by dividing the pixel, as a representative sub-pixel, and store a pixel value of the representative sub-pixel into a first storage area; and
- a sub-pixel value storage unit configured to store, into a second storage area, pixel values of two or more of the plural sub-pixels other than the representative sub-pixel,
- wherein the second storage area stores one or more sets corresponding to N number of pixels, the one or more sets each including a pixel position and a pixel value of each sub-pixel other than the representative sub-pixel of a pixel at the pixel position, N being a natural number greater than zero and smaller than a total number of the plural pixels included in the unit of processing.

22. The image processing device according to claim 21, further comprising
- an edge determination unit configured to determine, for each of the plural pixels in the unit of processing, whether the pixel includes a predetermined edge,
- wherein the sub-pixel value storage unit is configured to store, into the second storage area, pixel values of two or more of the plural sub-pixels in each of pixels determined by the edge determination unit to include the predetermined edge, the two or more of the plural sub-pixels being other than the representative sub-pixel selected by the representative pixel value storage unit.

23. The image processing device according to claim 22,
- wherein the N number of pixels are smaller in number than the plural pixels included in the unit of processing on which the edge determination unit performs the determination.

24. The image processing device according to claim 21, further comprising
- a pixel selection unit configured to select N pixels from among the pixels determined to include the predetermined edge, when the edge determination unit has determined that more than N pixels include the predetermined edge,
- wherein for each of one or more pixels that are not selected as the N pixels by the pixel selection unit from among the more than N pixels, the representative pixel value storage unit is configured to mix the pixel values of the plural sub-pixels to generate the representative sub-pixel,
- the representative pixel value storage unit is configured to store a pixel value of the generated representative sub-pixel into the first storage area, and
- the sub-pixel value storage unit is configured to store, for each of the N pixels selected by the pixel selection unit, the pixel value of each sub-pixel other than the representative sub-pixel into the second storage area.

25. The image processing device according to claim 21,
- wherein the total number of the plural pixels included in the unit of processing is a total number of the representative sub-pixels to be stored in the first storage area.

26. An image processing method for processing pixels in image data, wherein the unit size of the processing is a unit of processing including plural pixels, said image processing method comprising:
- for each of the plural pixels in the unit of processing, selecting, with a processor, one of plural sub-pixels obtained by dividing the pixel, as a representative sub-pixel, and storing a pixel value of the representative sub-pixel into a first storage area; and
- storing, into a second storage area, pixel values of two or more of the plural sub-pixels other than the representative sub-pixel,
- wherein the second storage area stores one or more sets corresponding to N number of pixels, the one or more sets each including a pixel position and a pixel value of each sub-pixel other than the representative sub-pixel of a pixel at the pixel position, N being a natural number greater than zero and smaller than a total number of the plural pixels included in the unit of processing.

27. A non-transitory computer-readable recording medium storing a program for causing a computer to execute an image processing method for processing pixels in image data, wherein the unit size of the processing is a unit of processing including plural pixels, the method comprising:
- for each of the plural pixels in the unit of processing, selecting one of plural sub-pixels obtained by dividing the pixel, as a representative sub-pixel, and storing a pixel value of the representative sub-pixel into a first storage area; and
- storing, into a second storage area, pixel values of two or more of the plural sub-pixels other than the representative sub-pixel,
- wherein the second storage area stores one or more sets corresponding to N number of pixels, the one or more sets each including a pixel position and a pixel value of each sub-pixel other than the representative sub-pixel of a pixel at the pixel position, N being a natural number greater than zero and smaller than a total number of the plural pixels included in the unit of processing.

28. An integrated circuit for processing pixels in image data, wherein the unit size of the processing is a unit of processing including plural pixels, said integrated circuit comprising:
- a representative pixel value storage unit configured to, for each of the plural pixels in the unit of processing, select one of plural sub-pixels obtained by dividing the pixel, as a representative sub-pixel, and store a pixel value of the representative sub-pixel into a first storage area; and
- a sub-pixel value storage unit configured to store, into a second storage area, pixel values of two or more of the plural sub-pixels other than the representative sub-pixel,
- wherein the second storage area stores one or more sets corresponding to N number of pixels, the one or more sets each including a pixel position and a pixel value of each sub-pixel other than the representative sub-pixel of a pixel at the pixel position, N being a natural number greater than zero and smaller than a total number of the plural pixels included in the unit of processing.

* * * * *